Feb. 2, 1960 J. M. HAIT ET AL 2,923,396

APPARATUS FOR ORIENTING INDENTED FRUIT

Filed Nov. 26, 1948 14 Sheets-Sheet 1

INVENTORS
JAMES M. HAIT
BRUCE H. KELLOGG
BY Lyon & Lyon
ATTORNEYS

APPARATUS FOR ORIENTING INDENTED FRUIT

Filed Nov. 26, 1948 14 Sheets-Sheet 2

INVENTORS
JAMES M. HAIT
BRUCE H. KELLOGG

BY Lyon & Lyon
ATTORNEYS

Feb. 2, 1960 J. M. HAIT ET AL 2,923,396

APPARATUS FOR ORIENTING INDENTED FRUIT

Filed Nov. 26, 1948 14 Sheets-Sheet 3

INVENTORS
JAMES M. HAIT
BRUCE H. KELLOGG

BY Lyon & Lyon

ATTORNEYS

Feb. 2, 1960 J. M. HAIT ET AL 2,923,396

APPARATUS FOR ORIENTING INDENTED FRUIT

Filed Nov. 26, 1948 14 Sheets-Sheet 4

INVENTORS
JAMES M. HAIT
BRUCE H. KELLOGG

BY Lyon & Lyon

ATTORNEYS

Feb. 2, 1960 J. M. HAIT ET AL 2,923,396

APPARATUS FOR ORIENTING INDENTED FRUIT

Filed Nov. 26, 1948 14 Sheets-Sheet 5

INVENTORS
*JAMES M. HAIT*
*BRUCE H. KELLOGG*

BY Lyon & Lyon

ATTORNEYS

Feb. 2, 1960 J. M. HAIT ET AL 2,923,396

APPARATUS FOR ORIENTING INDENTED FRUIT

Filed Nov. 26, 1948 14 Sheets-Sheet 6

INVENTORS
JAMES M. HAIT
BRUCE H. KELLOGG

BY Lyon & Lyon
ATTORNEYS

Feb. 2, 1960 J. M. HAIT ET AL 2,923,396

APPARATUS FOR ORIENTING INDENTED FRUIT

Filed Nov. 2-, 1948 14 Sheets-Sheet 7

INVENTORS
JAMES M. HAIT
BRUCE H. KELLOGG

BY Lyon & Lyon

ATTORNEYS

Feb. 2, 1960 J. M. HAIT ET AL 2,923,396

APPARATUS FOR ORIENTING INDENTED FRUIT

Filed Nov. 26, 1948 14 Sheets-Sheet 8

INVENTORS
JAMES M. HAIT
BRUCE H. KELLOGG

BY Lyon & Lyon

ATTORNEYS

Feb. 2, 1960 J. M. HAIT ET AL 2,923,396

APPARATUS FOR ORIENTING INDENTED FRUIT

Filed Nov. 26, 1948 14 Sheets-Sheet 9

INVENTORS
*JAMES M. HAIT*
*BRUCE H. KELLOGG*

BY Lyon & Lyon

ATTORNEYS

APPARATUS FOR ORIENTING INDENTED FRUIT

Filed Nov. 26, 1948 14 Sheets-Sheet 10

INVENTORS
JAMES M. HAIT
BRUCE H. KELLOGG
BY
Lyon & Lyon
ATTORNEYS

Feb. 2, 1960 J. M. HAIT ET AL 2,923,396

APPARATUS FOR ORIENTING INDENTED FRUIT

Filed Nov. 26, 1948 14 Sheets-Sheet 11

INVENTORS
JAMES M. HAIT
BRUCE H. KELLOGG

BY Lyon & Lyon

ATTORNEYS

APPARATUS FOR ORIENTING INDENTED FRUIT

INVENTORS
JAMES M. HAIT
BRUCE H. KELLOGG

BY Lyon & Lyon
ATTORNEYS

INVENTORS
JAMES M. HAIT
BRUCE H. KELLOGG

BY Lyon & Lyon

ATTORNEYS

INVENTORS
JAMES M. HAIT
BRUCE H. KELLOGG
BY Lyon & Lyon
ATTORNEYS

United States Patent Office 2,923,396

Patented Feb. 2, 1960

2,923,396

APPARATUS FOR ORIENTING INDENTED FRUIT

James M. Hait, San Jose, and Bruce H. Kellogg, Los Gatos, Calif., assignors, by mesne assignments, to Food Machinery and Chemical Corporation, San Jose, Calif., a corporation of Delaware Application November 26, 1948, Serial No. 62,046

43 Claims. (Cl. 198—33)

The present invention relates to fruit orienting methods and apparatus and particularly to methods and apparatus for handling fruit having a meridional seam or suture line which expands into a pronounced indent or cavity at the stem end thereof, such as peaches, apricots, and the like. For such fruit to be neatly pitted and sliced into its natural halves in a fruit preparation machine, it is necessary that it be first positioned with its stem blossom axis pointing in a predetermined direction and its seam or suture extending within a predetermined plane.

One object of the present invention is to provide apparatus for handling fruit of the kind referred to, in a manner that will dependably secure a predetermined orientation of the stem blossom axis of the fruit.

Another object is to provide apparatus for orienting fruit of the kind referred to in a manner that will quickly and dependably align the seam or suture of the fruit within a predetermined plane.

Another object is to provide apparatus for orienting peaches, and like fruit, in such a manner that their stem blossom axes assume a predetermined position with the stem indents pointing in a predetermined direction, and the seams or sutures disposed within a predetermined plane.

Another object is to provide mechanism causing the surface of a peach, or like fruit, to be systematically scanned by a finder element until the stem indent of said fruit will be engaged by said finder element.

A further object is to provide means for seating a fruit, of the type referred to, with its stem indent upon an indent finder element, while preventing other indents or dimples that may exist in the surface of said fruit from permanently seating themselves upon said finder element.

Another object is to provide an orienting mechanism of such type that a fruit will automatically disengage itself from the effect of said mechanism whenever orientation has been accomplished.

Another object is to provide orienting mechanisms, of the type referred to, which are fast in operation and capable of processing large quantities of fruit in a minimum of time without undue complexity in construction.

A further object of the present invention is to provide automatic means for transferring peaches, or like fruit, from orienting mechanisms of the type described to a fruit preparation machine without impairment of the established orientation.

Another object is to provide transfer mechanisms adapted to automatically grip a peach, or like fruit, at either side of its suture plane, upon termination of the orienting process, and to release said fruit automatically upon presentation thereof to the processing station of a fruit preparation machine.

Another object is to provide an automatic transfer mechanism for fruit of variable size, which is adapted to firmly grip such fruit whether the gripped specimen be large or small.

A further object is to provide a transfer mechanism, of the type referred to, that will firmly grip the smallest specimen of the fruit for which it is designed, yet will cause no injury to the larger specimens thereof.

These and other objects and advantages of the present invention will become apparent from the following description and drawings in which.

Figs. 7, 8, 9, and 10 are enlarged fragmentary plan views of one of the orienting units of the machine in different operational positions.

Figs. 11, 12, 13, and 14 are fragmentary side views, partly in elevation and partly in section, of the same orienting unit in different operational positions.

Figures 1, 16:
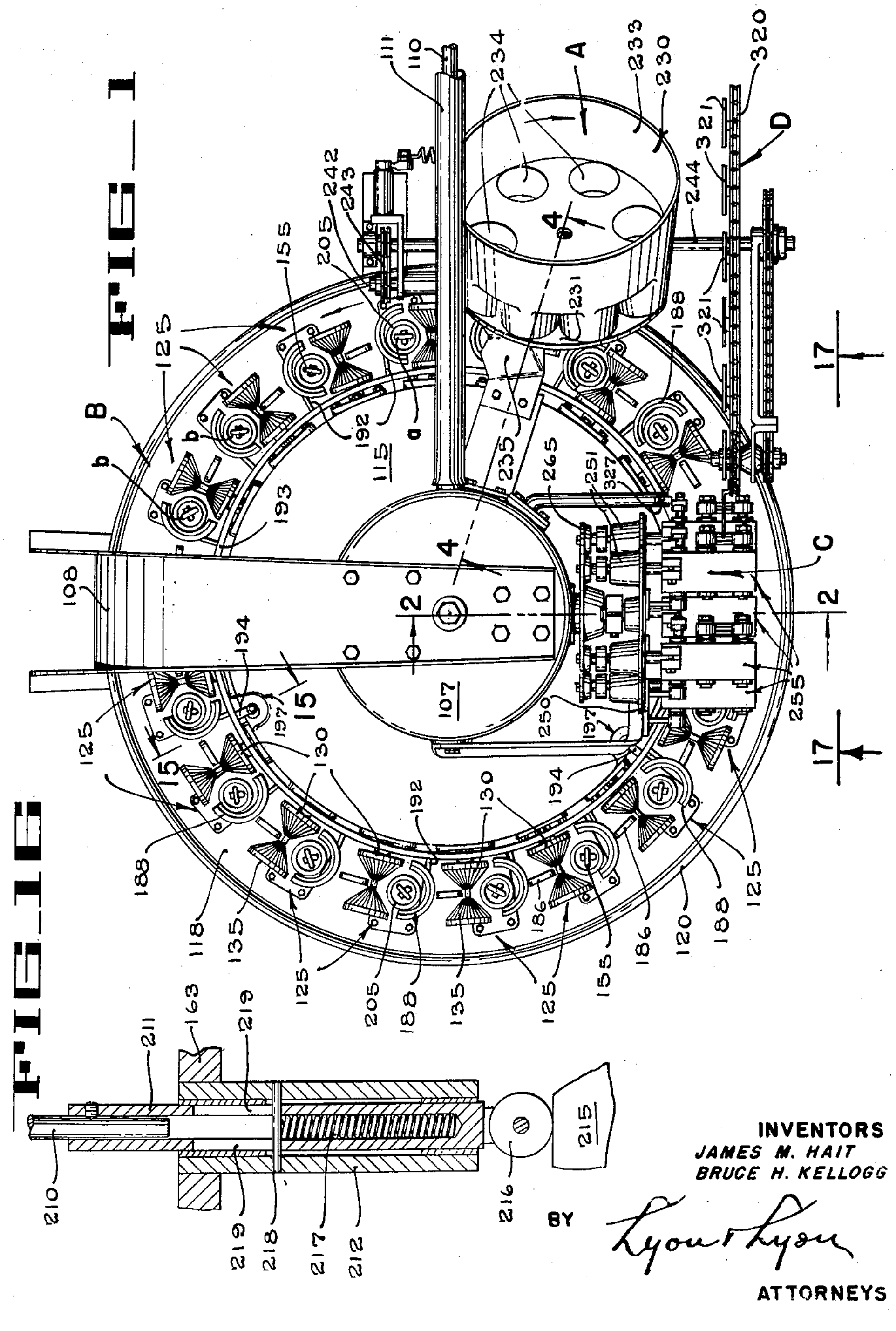
Fig. 1 is a plan view of the fruit orienting machine of the present invention.
Figures 13, 14, 15:
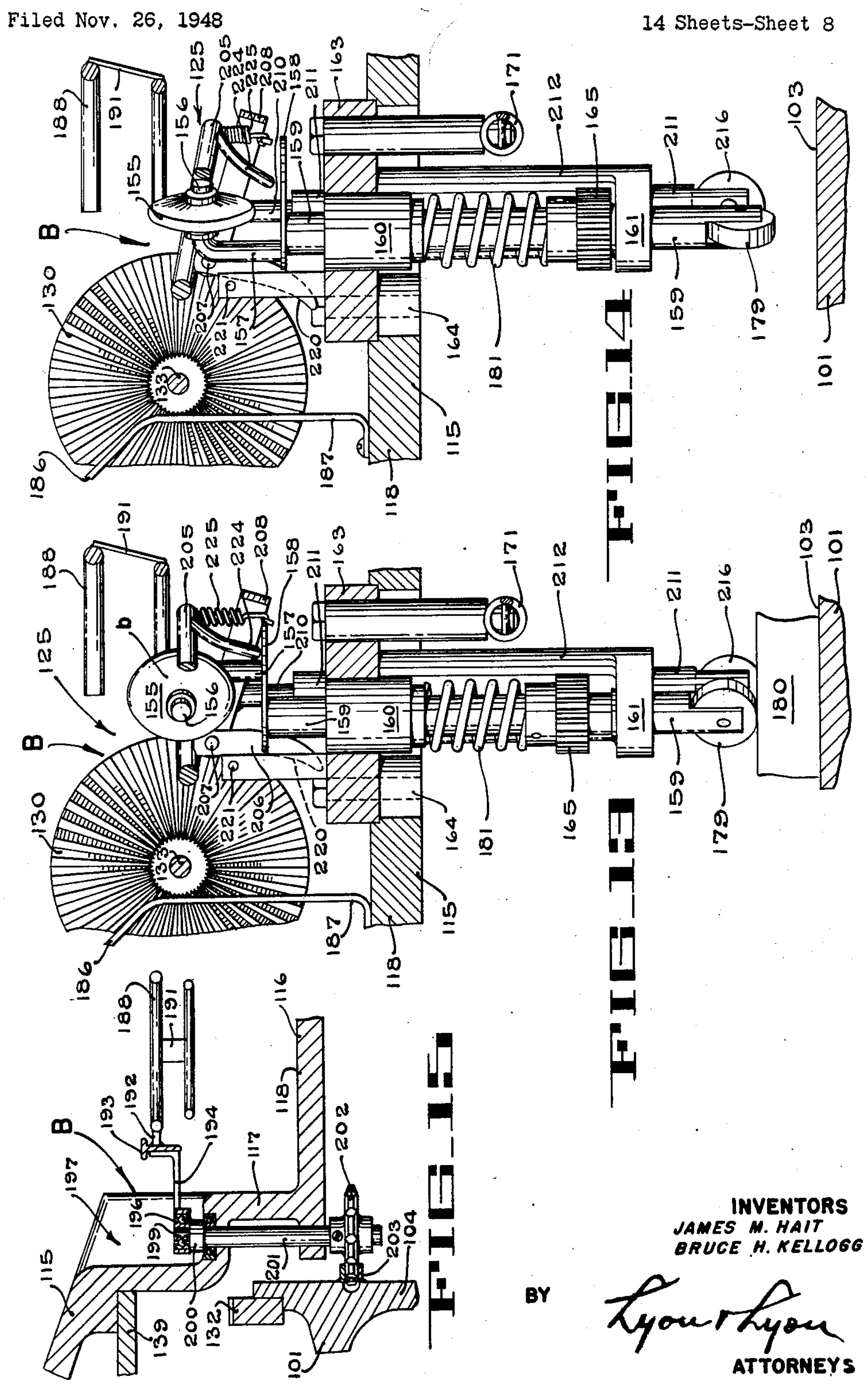

Fig. 15 is an enlarged detail view, partly in section and partly in elevation, illustrating the actuating mechanism of one of the components of an orienting unit, taken along line 15—15 in Fig. 1.

Fig. 16 is a detail view showing a vertical section through the control mechanism of another one of the components of such an orienting unit.

Figures 17, 18:
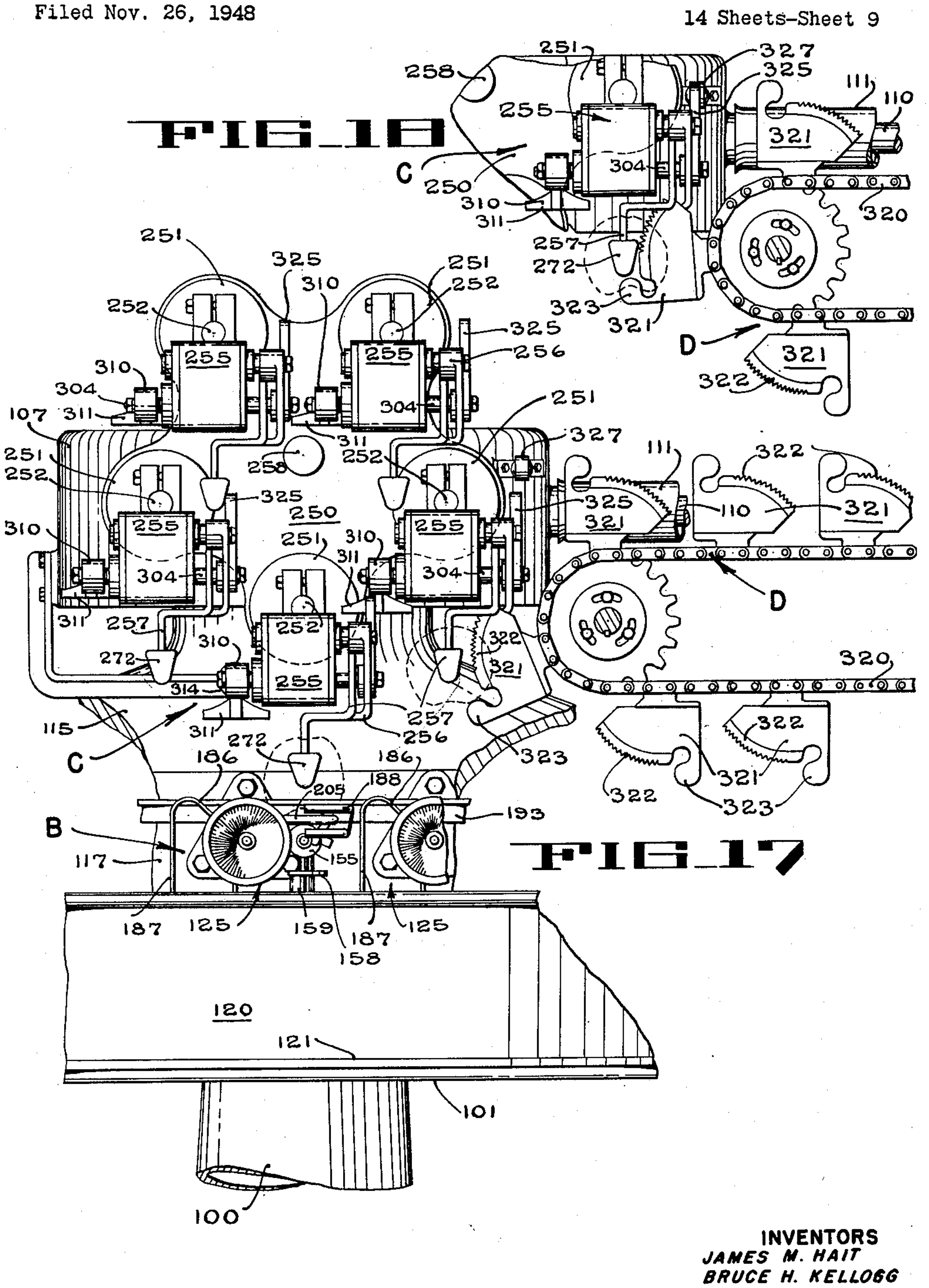

Fig. 17 is an enlarged side elevation of a portion of the machine viewed in the direction of the arrows 17—17 of Fig. 1 and illustrating the station at which the oriented fruit is transferred onto an endless conveyor belt equipped with impaling knives.

Fig. 18 is a fragmentary detail view in elevation, similar to Fig. 17, illustrating a slightly different phase in the transfer process of the fruit from the orienting mechanism onto the impaling knives.

Figures 19, 20:
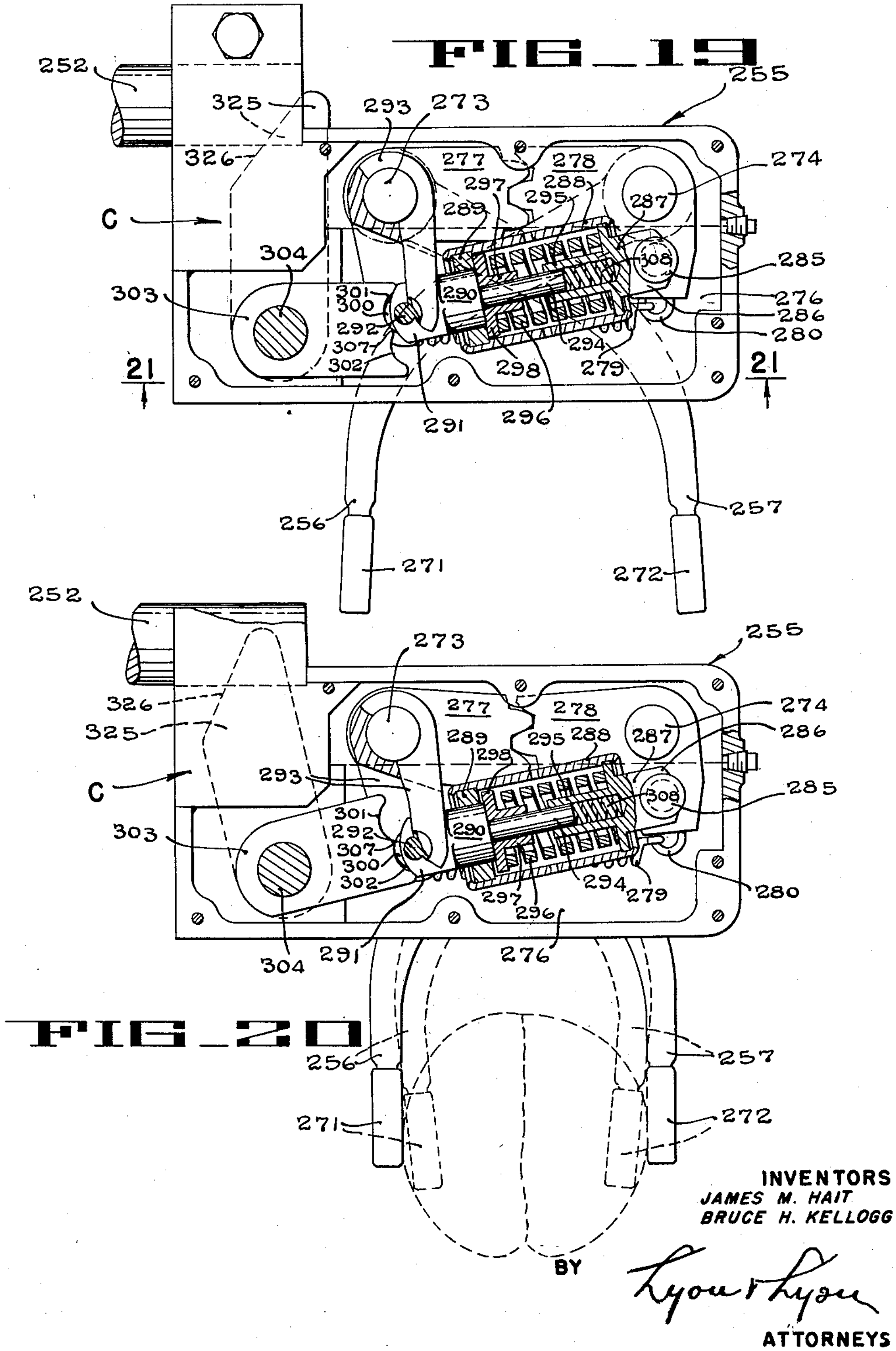

Figs. 19 and 20 are enlarged longitudinal vertical sections through the gripping mechanism of a transfer unit in different operational positions.

Figure 21:
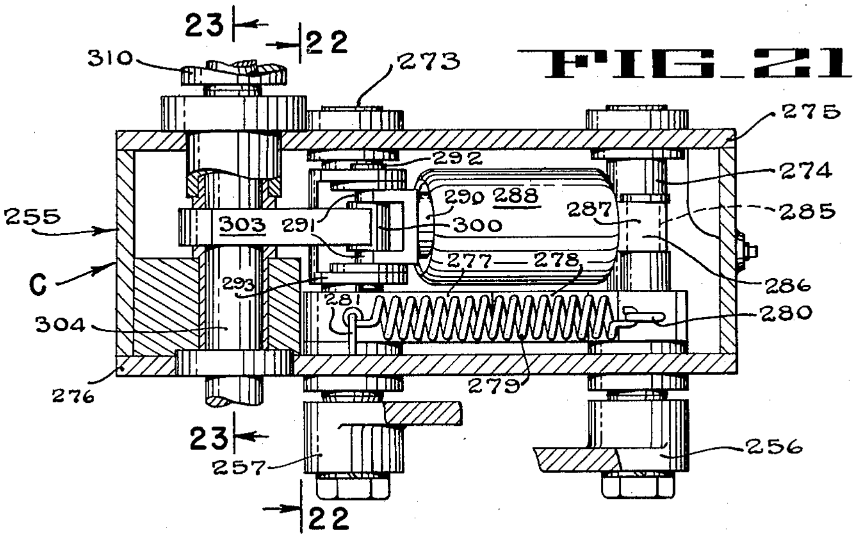

Fig. 21 is a section of the same transfer unit taken along line 21—21 of Fig. 19.

Figures 22, 23:
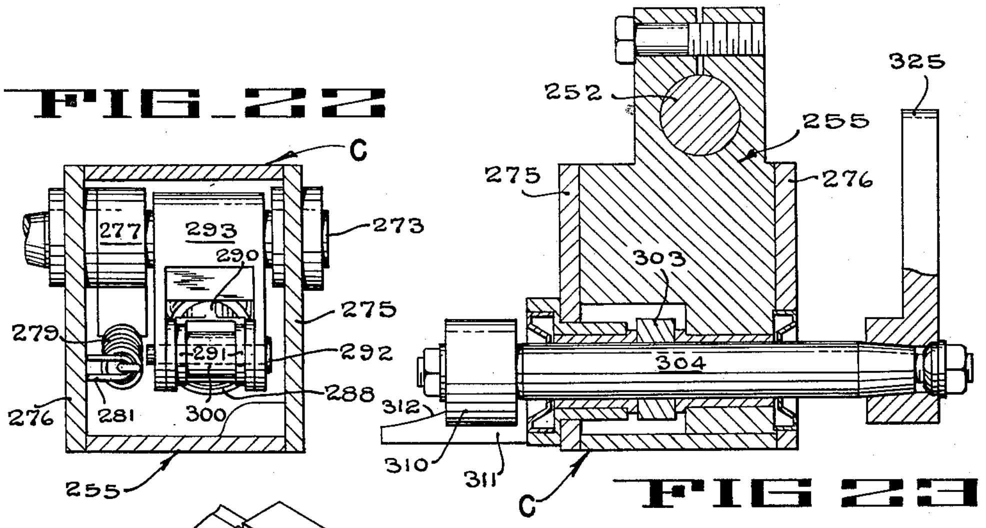

Fig. 22 is a cross section through the transfer unit taken along line 22—22 of Fig. 21, certain parts being omitted.

Fig. 23 is another cross section through the transfer unit taken along line 23—23 of Fig. 21.

Figure 24:
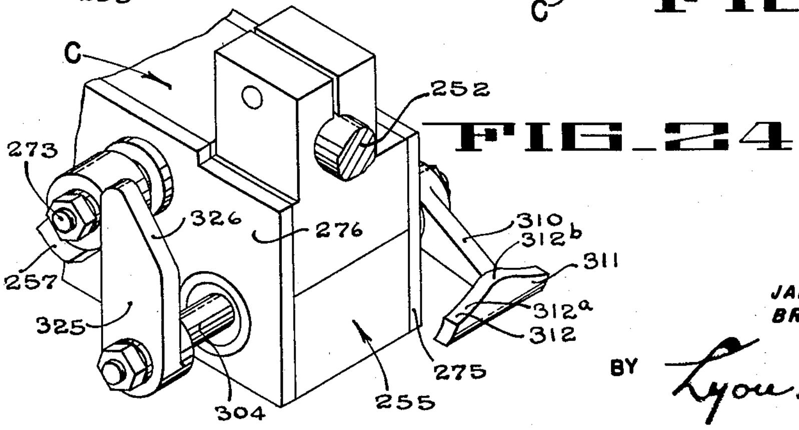

Fig. 24 is a fragmentary perspective of the transfer unit.

Figures 25A, 25B, 25C:
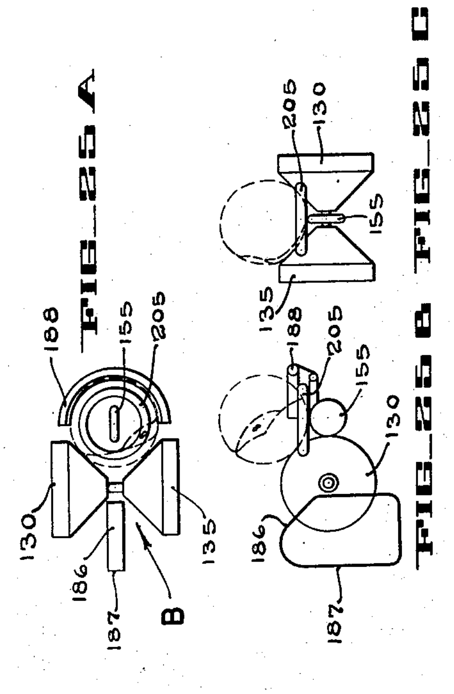
Figures 29A, 29B, 29C, 30A, 30B, 30C, 31A, 31B, 31C:
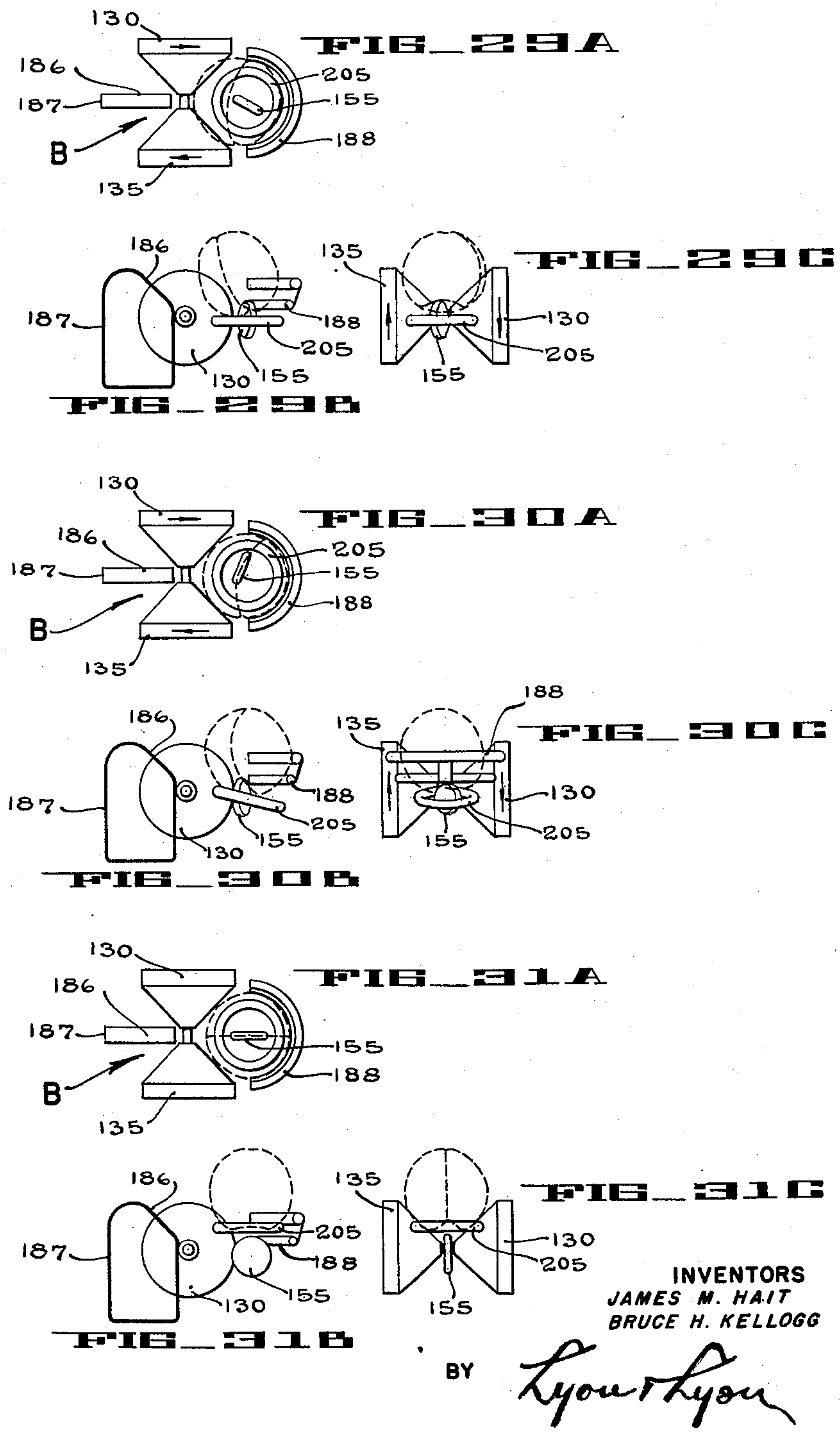

Figs. 25A, B, and C to Figs. 31A, B, and C, inclusive, are sets of diagrammatical illustrations of a fruit orienting unit (A) in plan view, (B) in side elevation, and (C) in front elevation, with each of said sets illustrating a different operational position of said unit.

Figure 32:
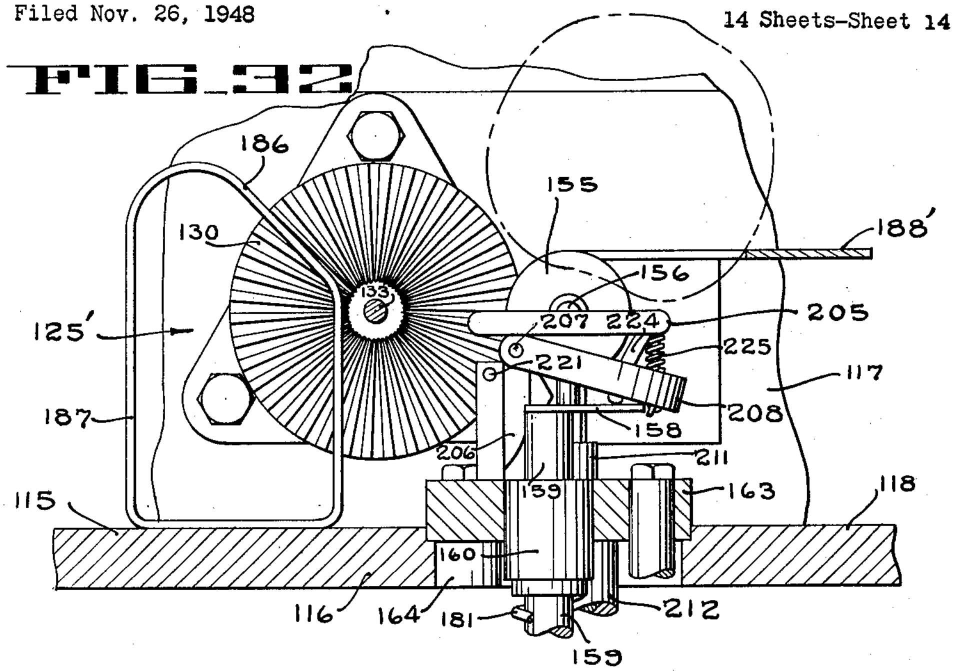

Fig. 32 is a fragmentary side view partly in section of a modified orienting unit constructed in accordance with the invention.

Figure 33:
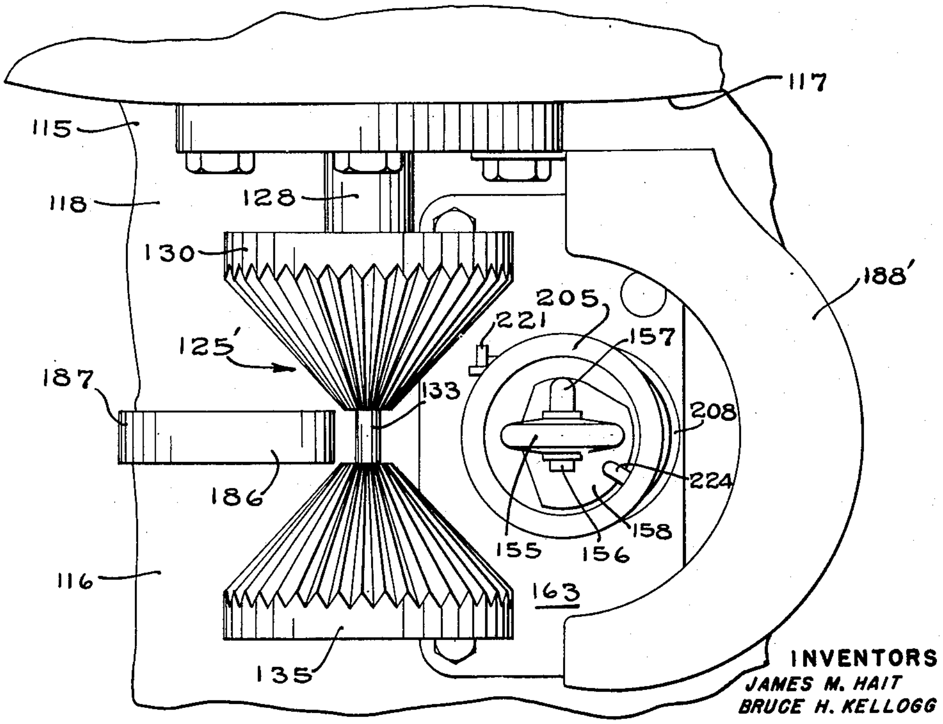

Fig. 33 is a plan view of the same modified orienting unit.

As best shown in Fig. 1, the machine of the present invention illustrated in the accompanying drawings comprises an automatic feed hopper A, a fruit orienting mechanism B, and a transfer mechanism C which delivers the oriented fruit onto a conveyor D of a fruit preparation machine. The conveyor D illustrated herein is of the type carrying an endless sequence of impaling knives, as will be described in greater detail hereinafter.

Figures 2, 3:
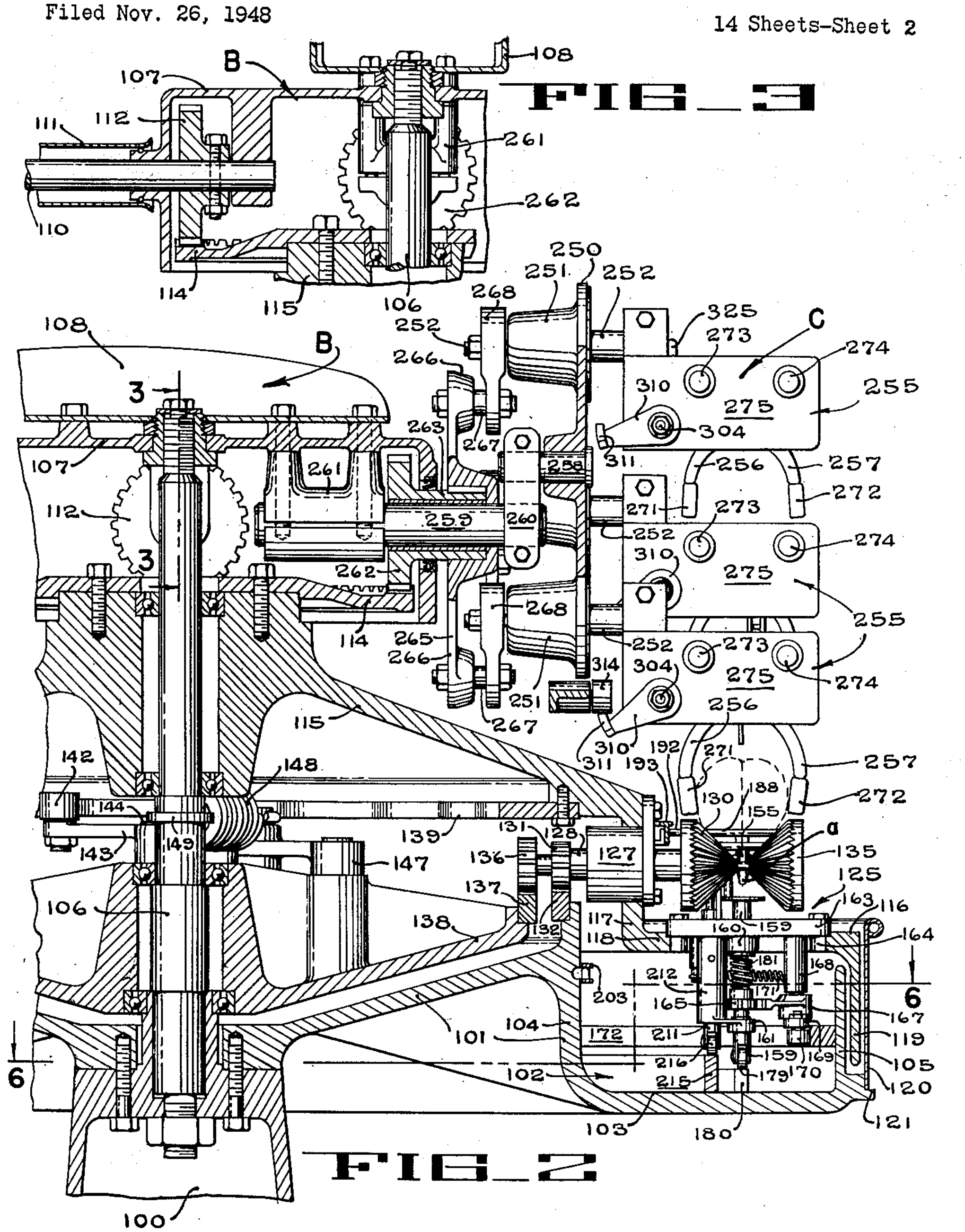
Fig. 2 is an enlarged vertical section of a portion of the machine taken along line 2—2 of Fig. 1.
Fig. 3 is a fragmentary view, partly in elevation and partly in section, of the power train of the machine taken along line 3—3 of Fig. 2.
Figure 4:
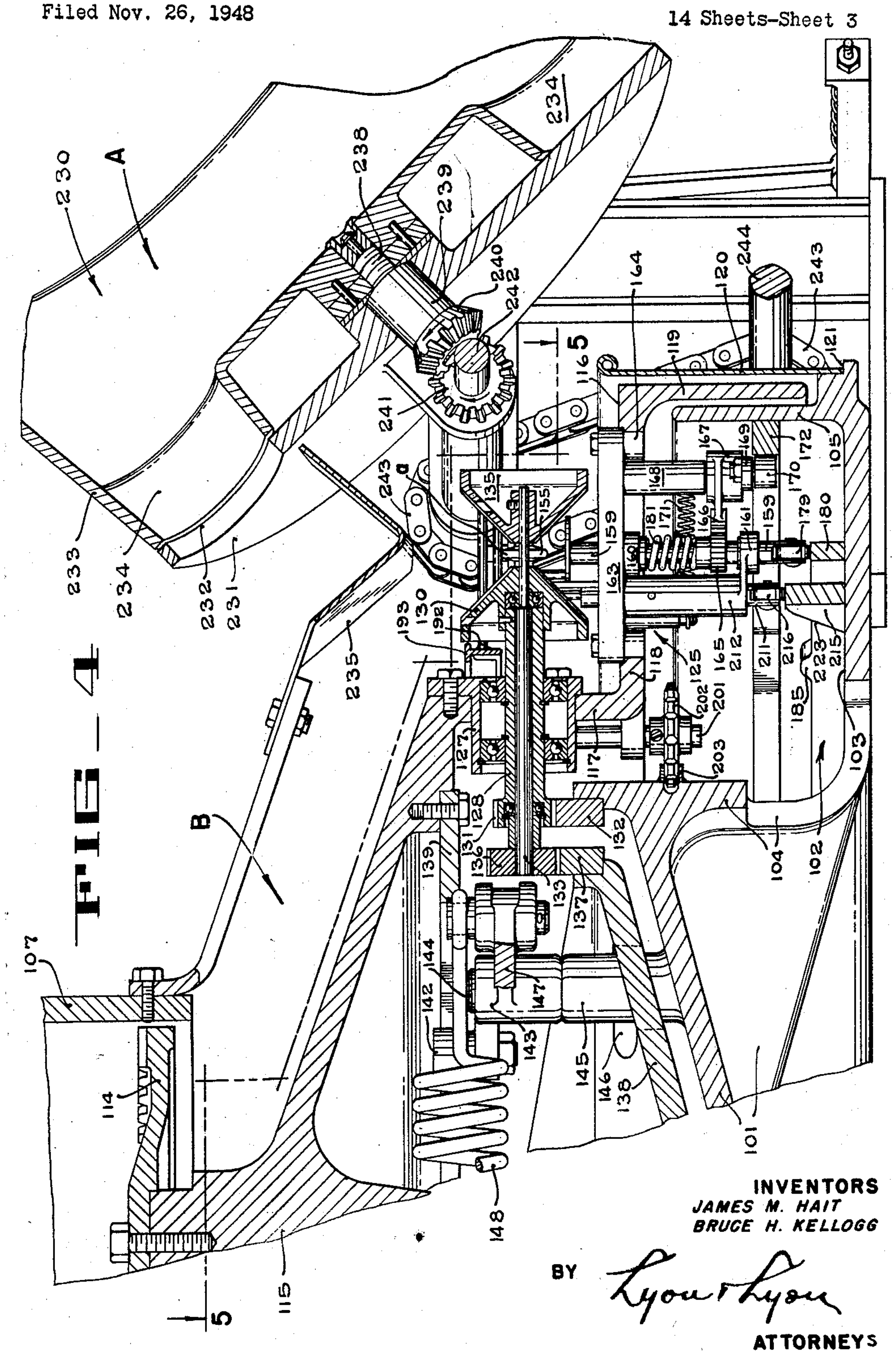
Fig. 4 is a vertical section of another portion of the machine taken along line 4—4 of Fig. 1.

The fruit orienting machine (Fig. 2) comprises a stationary base 100 to which is bolted a disc-like casting 101. The peripheral area of said casting is formed in the manner of an annular channel or runway 102 having a flat bottom 103 and substantially vertical walls 104 and 105, as best shown in Figs. 2 and 4. Mounted upon the base 100 concentrically with the circular casting 101 is a vertically disposed stationary shaft 106 which carries upon its upper end a dome or cupola 107 of cast iron, or the like. For added support, said cupola is bolted to the upper shank of a yoke member 108 (Figs. 1, 2, and 6) which holds it securely in a horizontal position parallel to the disc 101 and is, in turn, rigidly supported from the stationary base 100.

Suitably journalled in the side wall of the cupola 107 (Figs. 1 and 3) is a radially disposed drive shaft 110, the exterior portion of which may be covered by a suitable metal sheath 111. Interiorly of the cupola 107 a vertically positioned gear 112 is keyed upon the drive shaft 110 and meshes with a horizontally positioned gear wheel 114 which is loosely arranged around the stationary main shaft 106 and is bolted to the upper face of another disc-like casting 115 rotatably disposed around said vertical shaft 106. This casting will hereinafter be referred to as the rotor or turret 115.

The edge of said turret 115 (Figs. 2 and 4) is formed in the manner of a two-stepped lip 116 which overlaps the channel 102 of the stationary disc 101 and has an inner vertically depending portion 117 spaced radially from the inner wall 104 of said channel, a horizontal portion 118 extending parallel to the bottom 103 of said channel beyond the outer wall 105 thereof, and an outer vertically depending end portion 119. To protect attending personnel from said outer lip portion 119 (Figs. 2, 4, and 17) when the turret 115 is in motion, an annular steel guard 120, suitably seated upon a rim or shoulder 121 projecting radially from the bottom of the stationary outer channel wall 105, may be arranged around said outer lip portion 119.

Mounted in and upon the outer lip 116 of the turret 115 for continuous movement around the center shaft 106 are numerous fruit orienting units 125 spaced equal angular intervals apart, as best shown in Fig. 1. Each of said fruit orienting units 125 is formed by a plurality of components which are actuated by movement of the turret 115 relative to the stationary disc 101 to perform characteristic motions that cooperate to rock and turn a peach or like fruit placed thereon systematically in such a manner that it will eventually assume a desired position with its stem blossom axis disposed in a predetermined direction and its seam aligned with a predetermined plane.

For this purpose, the cylindrical wall formed by the inner depending portion 117 of the turret 115 is provided with a plurality of circumferentially spaced apertures and firmly seated in each of said apertures is a bearing 127 within which is rotatably arranged a radially extending tubular shaft 128, as shown in Fig. 4. Secured to the outer end of said shaft 128 is a fluted cone 130 with its peak pointing in outward direction (Figs. 2 and 5) and the inner end of said shaft carries a pinion 131 which meshes with a circular rack 132 mounted on top of the inner channel wall 104 formed in the stationary disc 101. Thus, whenever operation of the drive shaft 110 turns the turret 115 in counterclockwise direction (as viewed in Fig. 5), the pinion 131 and, hence, the shaft 128 with the fluted cone 130 are turned in clockwise direction, as viewed from the periphery of the machine.

Rotatably disposed within the interior of the tubular shaft 128 and projecting beyond said shaft at either end thereof is another shaft or spindle 133. The outer end of said shaft 133 carries a similar fluted cone 135 positioned adjacent to cone 130 with its peak pointing in opposite direction, as illustrated in Fig. 5, and keyed to the inner end of said shaft is a pinion 136 which meshes with another circular rack 137, as shown in Figs. 2 and 4.

During the operation of the machine, this second rack 137 is caused to turn in alternate directions over an arc of limited angular width, and for this purpose said rack is mounted upon the edge of another disc-like casting 138 which is disposed between the turret 115 and the stationary disc 101 and is arranged to oscillate around the stationary main shaft 106. During operation of the machine, said oscillating disc 138 is actuated by a cam arrangement that comprises an internal cam 139 which is bolted to the underside of the turret 115, as shown in Fig. 2, and the inner contour of which has somewhat the appearance of a circular saw possessing a continuous sequence of inwardly directed peaks 140 and outwardly receding depressions 141, as best shown in dotted lines in Fig. 6. This cam 139 is engaged by the roller 142 of a cam follower lever 143 which turns on a stud 144 mounted in a boss 145, that is integral with the stationary disc 101 and protrudes upwardly through an arcuate slot 146 in the oscillating disc 138. A link 147 pivoted at opposite ends to the disc 138 and the free end of the lever 143, respectively, operatively connects said disc to the described cam arrangement and a contraction spring 148 tensioned between a washer 149 turning on the main shaft 106 and the pivotal connection between link 147 and cam follower lever 143 maintains the roller 142 in contact with the contour of the cam 139.

Figure 5:
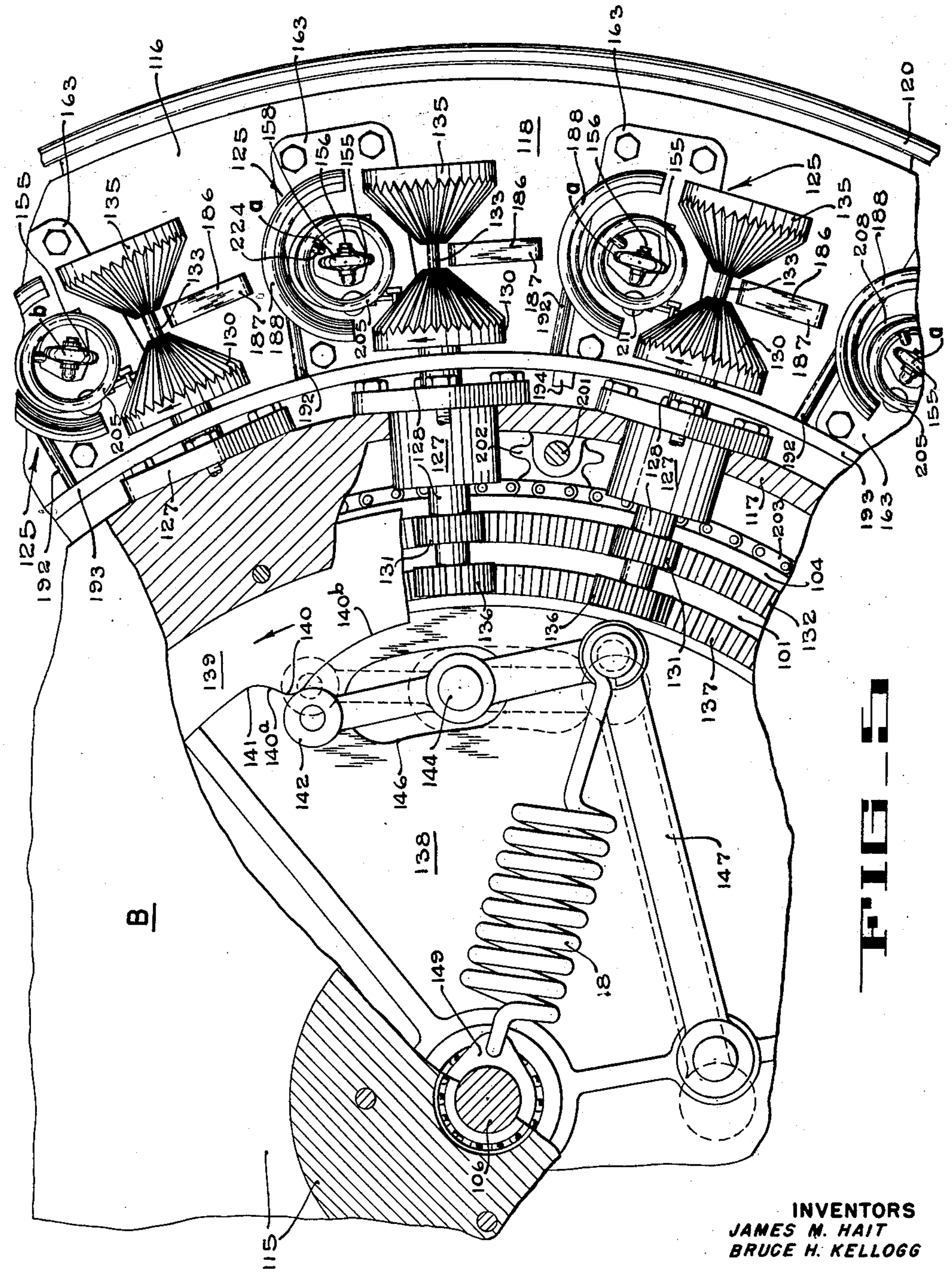
Fig. 5 is a substantially horizontal section of the machine taken along line 5—5 of Fig. 4.

During operation of the machine, the turret 115 and, hence, the cam 139 are turned constantly in one direction, which may be the counterclockwise direction as viewed in Fig. 5, and, as a result thereof, the roller 142 is forced to negotiate the cam peaks 140 and the depressions 141 in continuous succession. Every time said roller ascends a peak 140, the cam follower lever 143 is turned in counterclockwise direction and pulls the disc 138 in the direction of movement of the turret 115 over an arc determined by the altitude of said peak 140. Fig. 5 illustrates in full lines the condition of the described cam follower mechanism when the disc 138 is in its extreme counterclockwise position, as indicated by the fact that the clockwise end of the arcuate slot 146 is almost in contact with the stationary boss 145. As soon as the roller 142 descends from the peak 140, however, the spring 148 returns the disc 138 to a clockwise position which is determined by the depth of the cam depression 141. In Fig. 5, this latter position is represented in broken lines which show that is now the counterclockwise end of the arcuate slot 146 which is almost in contact with the stationary boss 145. Hence, during the peak ascending phase of the cyclic cam follower movements, the rack 137 shifts in counterclockwise direction which reduces the rotational speed of the pinions 136 that are enmeshed with and travel in counterclockwise direction upon said rack. In the preferred embodiment of our invention, as illustrated in the accompanying drawings, the ascending slope **140*a* of the peaks 140 is actually of such steepness that the counterclockwise shift of the inner rack occurs at a greater angular speed than the counterclockwise motion of the turret 115 so that the pinions 136** will actually reverse their direction of rotation for a brief period of time.

During the descending phase of the cyclic cam follower movements, however, the inner rack 137 is returned to its clockwise position at a speed determined by the grade of the descending slope **140*b* causing the pinions 136 to turn at a faster rate in clockwise direction than the rate at which they would turn if the rack 137** were stationary.

In the illustrated embodiment of the present invention the descending slopes **140*b* are so graded that the pinions 136 will turn in clockwise direction at substantially the same speed as the outer pinions 132 irrespective of the greater diameter of the outer circular rack relative to its associated pinions which would normally cause said outer pinions to turn at a faster rate than the pinions enmeshed with the inner rack. Hence, as the turret 115 revolves around the main shaft 106, the inner cones 130 will steadily turn in clockwise direction, but the outer cones, while mostly turning in clockwise direction at the same speed as the inner cones, will intermittently reverse their movement for brief periods at a frequency determined by the number of peaks and depressions that are provided along the circumference of the cam 139**.

Figures 26A, 26B, 26C:
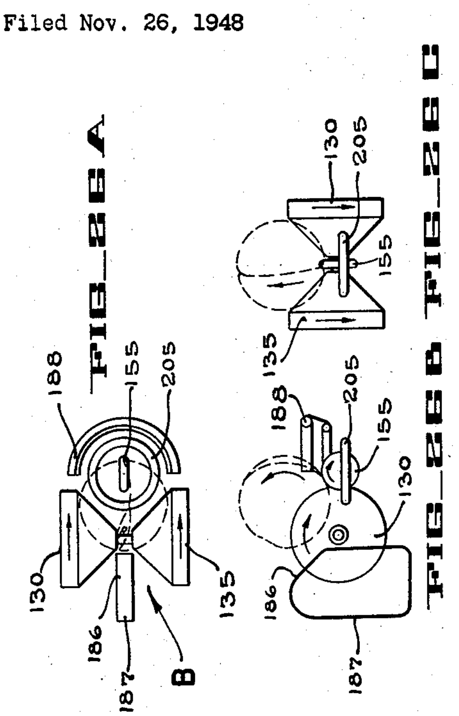

Associated with each pair of fluted cones 130, 135 is a vertically positioned disc or wheel 155 which is located within the symmetrical plane of said cones a predetermined horizontal distance in front thereof in the common direction of movement of their upper segments, as best shown in Fig. 5. Depending upon the average size of the fruit for which the machine is designed, the distance between the cones 130, 135 and the wheel 155 should be so chosen as to permit a fruit to seat itself upon said components with its center of gravity intermediately of its points of contact with the cones and its point of contact with the wheel, as illustrated in Figs. 26*a* and *b*. When a fruit is seated in this manner, and the cones 130, 135 are in operation with the upper segments of both moving in the direction of the wheel 155, the ridges of said cones will engage the fruit and roll it in an opposite direction around an axis parallel to their own with its surface in contact with the edge of the wheel 155. To facilitate the described rotational movement of the fruit, said wheel should be so arranged as to provide the required support for said fruit with minimum impediment to its rotatability. For this purpose, the wheel 155 (Figs. 11 and 12) is rotatably supported upon a horizontal spindle 156 which is initially parallel to the rotational axis of the cones 130, 135 and, as said cones rotate said fruit in contact with said wheel in a direction opposite to their own, as previously described, said wheel is, in turn, rotated around its spindle 156 in the same direction as said cones, as indicated by the arrows in Fig. 26*b*.

Thus, as long as the cones 130, 135 turn in the same direction, the wheel 155 will roll over the surface of the fruit substantially along a meridional circle thereof which may or may not contain the stem cavity of said fruit. As best shown in Figs. 7 to 11, the edges of each of the wheels 155 are rounded off and the wheels are sufficiently small in diameter and narrow in axial width to fit into the stem indent of a peach or what other fruit the machine may be designed for. Therefore, if the stem indent of the fruit should happen to lie in the path of the wheel 155, said fruit will drop with its stem cavity partly surrounding said wheel causing the center of gravity of the fruit to move downwardly to a lower level and forwardly to a point more nearly in vertical alignment with the center of the wheel 155 than in its former position. This change in the position of the fruit relative to the drive cones 130, 135 and the finder wheel 155, with the upper segment of the latter protruding into the stem indent thereof, causes further operation of the drive cones to force an inclined surface of the stem indent radially against the edge of the finder wheel, so that the fruit is securely held in engagement with the finder wheel and is unable to continue its scanning revolutions.

However, if, as is far more likely, the first meridional belt of the fruit surface scanned by the indent finder roller does not contain the stem cavity of the fruit, it is necessary that the fruit be shifted into a new position in which it will be turned around a different one of its diameters so that the finder wheel 155 may scan a different meridional belt of its surface. The natural unevenness in the shape of fruit, such as peaches, apricots, and the like, may, of course, be effective to reposition such fruit for rotation around different ones of its diameters, but considerable time may pass before such a change will occur. The above described temporary reversal in the direction of rotation of one of the fluted cones provides means, however, which positively shift the fruit after a predetermined scanning period into a new position in which the finder wheel 155 will scan another meridional belt of its surface.

Whenever the movement of the outer cone 135 is reversed in the manner previously described, the opposite rotational moments imparted to adjacent quadrants of the bottom hemisphere of the fruit turns said fruit around an axis that extends at right angles to its former axis of rotation and is angularly inclined to a horizontal plane in the direction of the finder wheel.

As a result thereof, the fruit is twisted out of its previous position relative to the scanning axis to an extent determined by the rapidity and duration of the reversal of the direction of rotation of cone 135, and, as soon as said cone resumes its forward movement, the fruit will be turned around another one of its diameters causing the finder wheel to scan another one of its circumferential belts. Thus, time wasting repetitive scanning of surface regions that do not contain the stem cavity, is effectively avoided and by appropriately proportioning the rapidity, duration, and frequency of the reversals of the direction of rotation of cone 135 the described mechanism may be adapted to systematically scan the total surface of a fruit along a predetermined number of meridional circles thereof.

To minimize interference of the finder wheel with the lateral shifts of the fruit, said wheel is arranged to assume automatically a position in which the twists imparted to the fruit by the reversal of the direction of rotation of the outer cone will roll it around its spindle 156. For this purpose, the horizontal spindle 156 is bent downwardly to form a stem 157 that is rigidly supported by the upper end of a vertical swivel shaft 159 which is disposed within upper and lower bearings 160 and 161, respectively, for horizontal revolving, as well as vertical sliding movement. These bearings may be supported from suitable mounting plates 163 which are bolted to the horizontal lip portion 118 of the turret 115, with said bearings protruding downwardly through corresponding apertures 164 provided in said lip portion, as shown in Figs. 4 and 11 to 14.

At a point intermediately of the bearings 160 and 161 the shaft 159 carries a gear 165 (Figs. 2, 4, 11, 12, 13, and 14) that meshes with a gear segment 166 (Figs. 7 to 10) which forms one arm of a cam follower lever 167. This cam follower lever 167 is pivoted on a bushing or sleeve 168 supported from the above mentioned mounting plate 163 and has a second arm 169 which is provided with a roller 170. A contraction spring 171 tensioned between the segment 166 and a suitable stud of the mounting plate 163 urges the roller 170 into contact with the contour of an internal cam 172 that is carried by the outer wall 105 of the channel or runway 102 formed in the peripheral region of the stationary disc 101 (Figs. 4 and 6).

Figure 6:
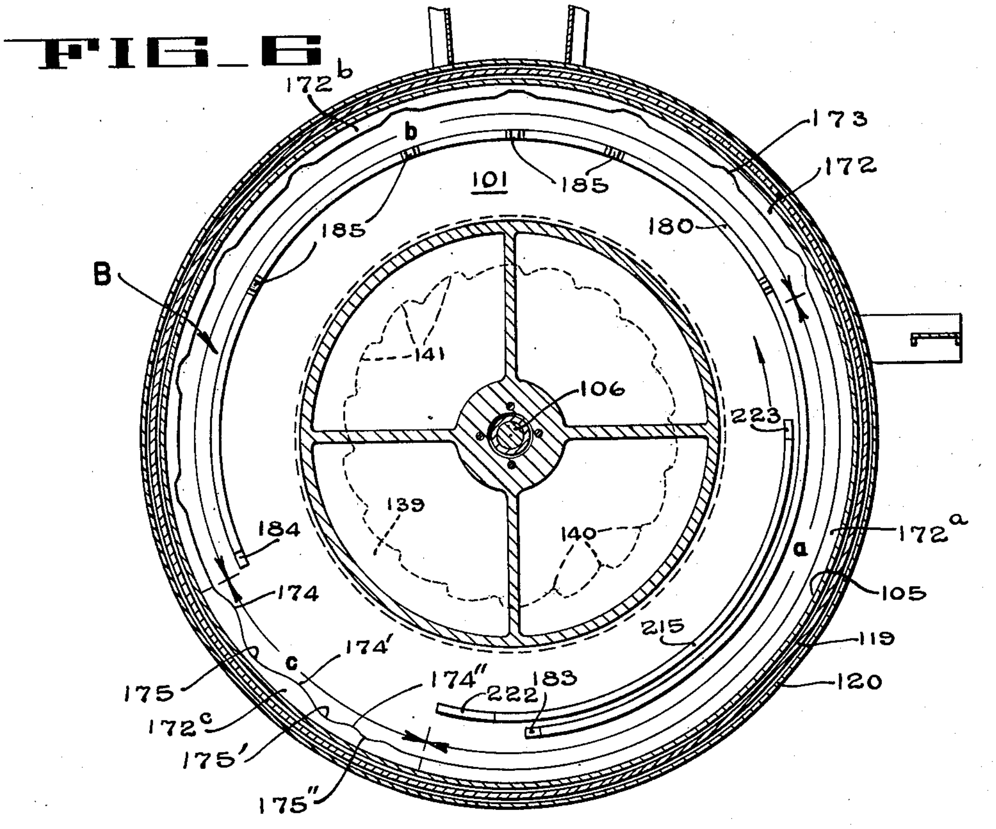
Fig. 6 is a reduced horizontal section through the stationary base portion of the machine taken along line 6—6 of Fig. 2, certain parts being omitted.
Figure 10:
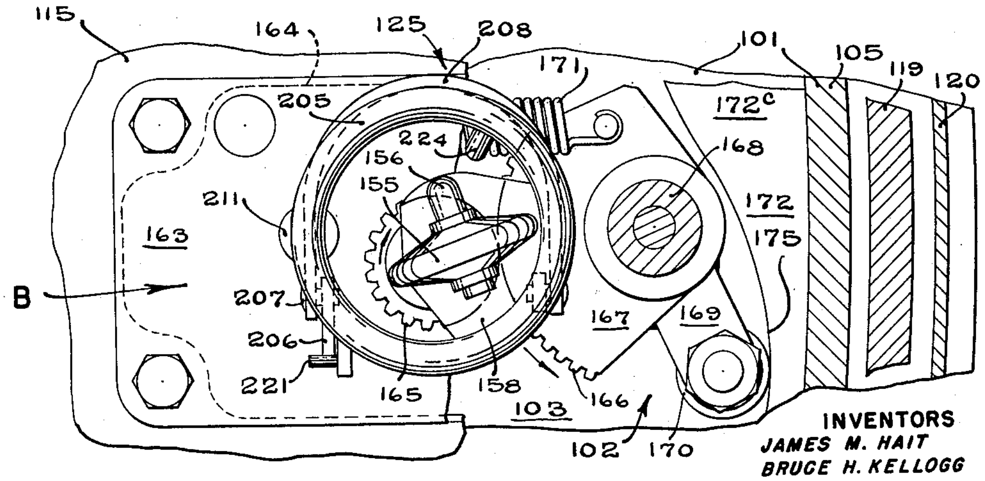
Figure 7:
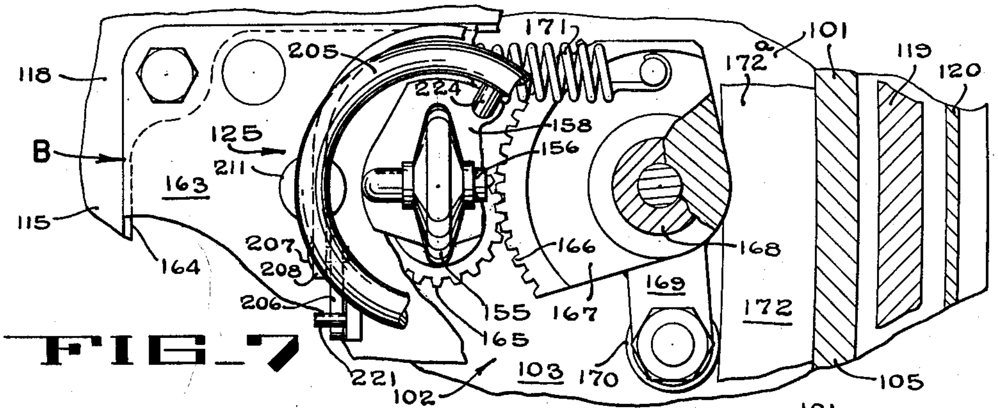
Figure 8:
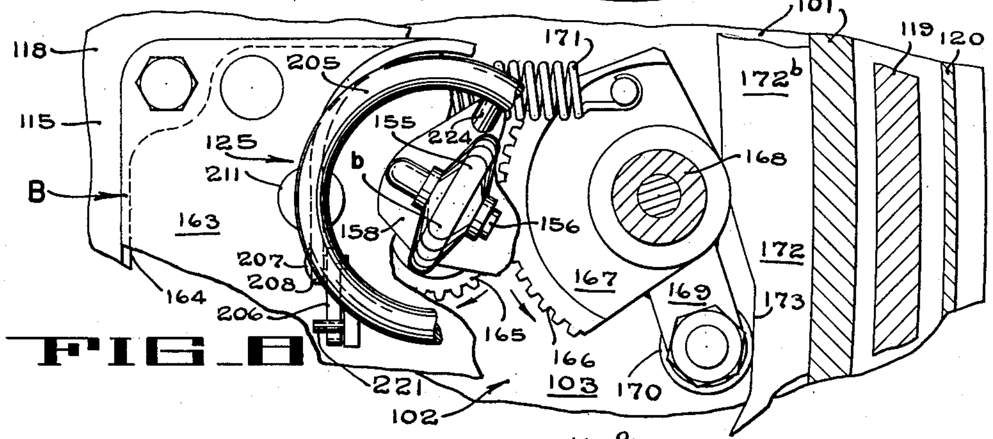
Figure 9:
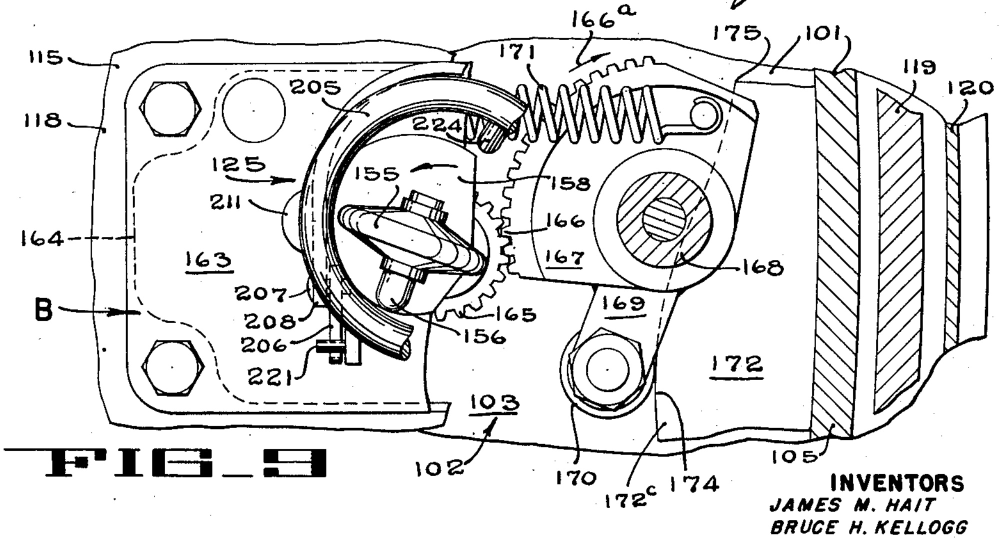

As best seen from Fig. 6, the internal cam 172 has an initial portion *a* that is smoothly circular and extends over approximately 120 degrees of its circumference. This cam portion maintains the gear segments 166 and the cooperating gears 165 in the position illustrated in Fig. 7 which aligns the vertical wheels 155 with the symmetrical planes of their associated cones 130, 135 and places them tangentially with respect to the circular course of the orienting units 125 around the center of the machine, as illustrated at *a* in Figs. 1 and 5. Over the adjoining 180 degrees of its circumference, however, the cam 172 possesses a sequence of recesses or depressions 173 of relatively narrow width which are spaced equal angular intervals apart, as shown at *b* in Fig. 6. Whenever the roller 170 of a cam follower lever 167 drops into such a depression, the spring 171 swings its segment 166 in counterclockwise direction, as shown in Fig. 8, and, in consequence thereof, the gear 165 enmeshed therewith is turned in clockwise direction placing its wheel 155 at an acute angle relative to a plane disposed at right angles to the axis of rotation of the cones 130, 135, as illustrated at *b* in Figs. 1 and 5. As the roller 170 climbs out of such a depression, however, the segment 166 and the gear 165 are quickly restored to their original positions in which the plane of their respective wheel 155 extends substantially tangentially with respect to its circular course of travel. Thus, as the fruit orienting units 125 are carried around the machine and pass through the sector *b* thereof, their wheels 155 oscillate intermittently from a tangential position with respect to their circular course (Fig. 7) to a selected clockwise position (Fig. 8) of an angular displacement determined by the depth of the recesses 173.

Figures 27A, 27B, 27C:
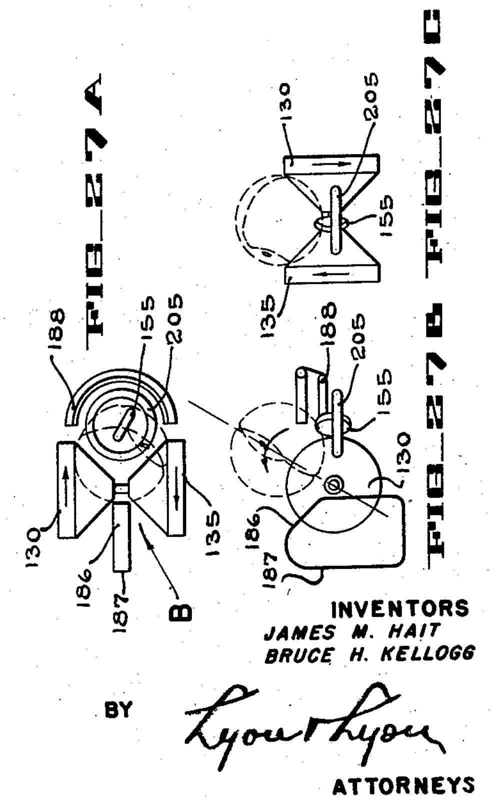

By appropriately spacing the recesses 173 along the cam sector 172*b* in relation to the intervals between consecutive peaks of the cam 139 which controls the movements of the reversible drive cones 135, the finder wheels 155 may, therefore, be arranged to momentarily swing into the position illustrated in Figs. 8 and 13 whenever their associated cones 135 reverse their direction of rotation. In this position the plane of rotation of the wheel is such that the peripheral rotational movement of the rim of the wheel is more nearly in the direction in which the fruit surface at the point of contact with the finder wheel must move into a new scanning plane in the manner described above (Fig. 27*a*), so that any frictional resistance presented by the wheel 155 to the steering shift of the fruit is effectively reduced by rotation of said wheel around its spindle 156 and will not appreciably affect the intended course of the steering twist imparted to the fruit.

Figure 12:
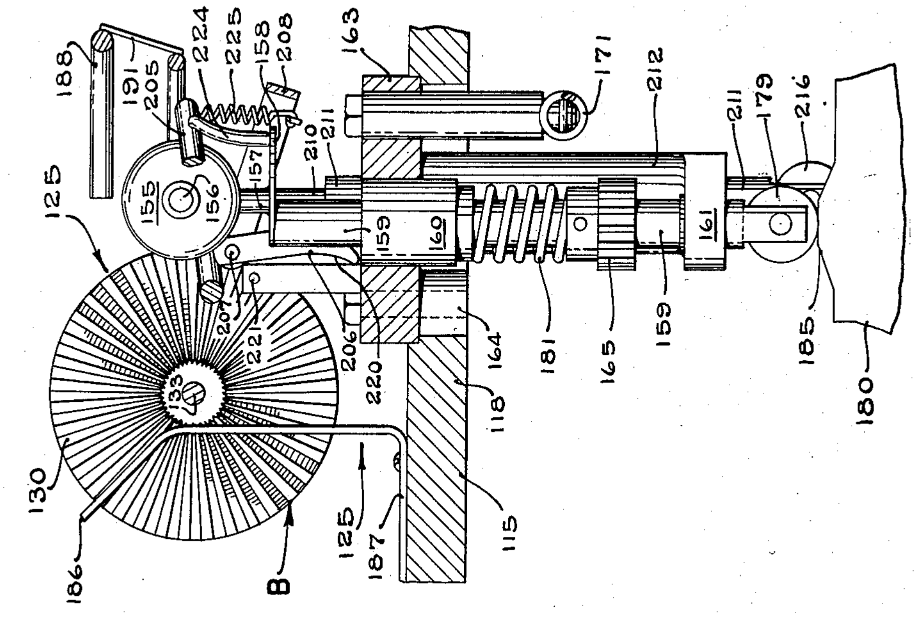
Figure 11:
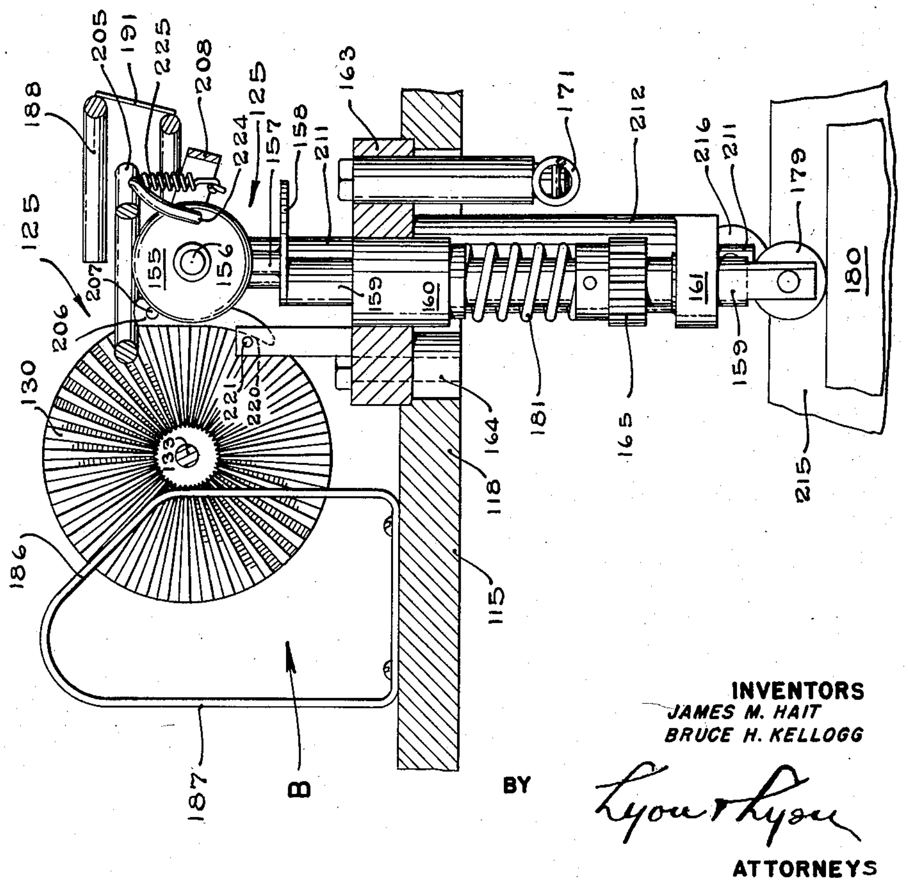

In the preferred embodiment of the invention illustrated in the accompanying drawings, the stem 157 of the finder wheels 155 is slightly off-set in a direction opposite to its associated drive cones 130, 135 such that the center line of the swivel shaft 159 intersects the edge of the finder wheel at a point somewhat below the wheel crest on the side facing the drive cones, as best shown in Figs. 11 and 12. This point is the presumptive point of contact between the wheel and a fruit seated upon the three-point support formed by said wheel and said drive cones and due to its position within the center line of the swivel shaft 159, said point will retain its place when the wheel 155 is swiveled around said shaft 159. Hence, when the finder wheel 155 is turned in clockwise direction (as viewed from the top) to accommodate the lateral twists imparted to the fruit by the reversal of the direction of rotation of the outer drive cone 135, this change in the position of said wheel will, in itself, impart relatively little movement to the fruit. Therefore, the extent of the described steering twists imparted to the fruit may be pre-established with a high degree of approximation by proper design of the ascending slopes 140*a* in the cone controlling cam 139.

Thus, as an orienting unit 125 travels along its circular course around the main shaft 106 of the machine, its finder wheel 155 will systematically scan the surface of a fruit seated on said unit along adjacent meridional circles and thus will sooner or later encounter the stem cavity of said fruit causing it to drop with said cavity onto the upper wheel segment which effectively prevents further driving and steering action of the fluted cones upon said fruit as previously described.

While the described orienting operation is effective to align the stem blossom axes of the fruit in a predetermined manner, the indent finder wheel 155 of the orienting unit will, in most instances, encounter the stem cavity at an angle relative to the suture plane of the fruit. Hence, although the axis of the fruit may now be properly oriented, its seam or suture plane may depart from the vertical plane of the finder wheel by as much as 90 degrees. To align the suture plane of the fruit with the vertical plane of the wheel 155, said wheel is, therefore, arranged to oscillate on its swivel shaft 159 in counterclockwise, as well as clockwise, direction (as viewed from the top) during the final phase of each complete fruit orienting cycle as provided by the machine of the present invention. For this purpose, the final 60 degrees of the annular cam 172 are of an undulating contour alternating between inwardly protruding rounded lobes 174, 174′, and 174″ and outwardly receding depressions 175, 175′, and 175″, respectively, of decreasing angular width and radial depth, as shown at *c* in Figure 6. As the roller 170 of a cam follower 167 ascends the lobe 174, the segment 166 of said cam follower is swung in clockwise direction, as indicated by the arrow 166*a* in Fig. 9 and turns its cooperating gear 165 in counterclockwise direction causing the wheel 155 to swing in the same direction into the position shown in said Fig. 9 which is angularly displaced in counterclockwise direction from the normal tangential position of said wheel 155 by an arc that may approach 90°. As the roller 170 descends from the top of the lobe 174 to the bottom of the succeeding depression 175 it causes the wheel 155 to reverse its course and swing through its tangential position of rest to the extreme clockwise position illustrated in Fig. 10 from where it returns to a counterclockwise position of lesser angular displacement as the roller ascends the second one of the inwardly directed lobes 174′; and after the roller 170 has negotiated all the lobes and depressions that may be provided, the wheel 155 settles in the original position illustrated in Fig. 7 wherein it is substantially aligned with the symmetrical plane of its associated cones 130 and 135, i.e., with a plane disposed at right angles to the axis of rotation of the cones. As the finder wheel 155 oscillates in this manner within and relative to the shallow portion of the stem cavity of the fruit, the sloping sides of the cavity will cooperate with the motion of the finder wheel to swing the suture plane of the fruit substantially into parallelism with the wheel plane in the neutral position assumed by the finder wheel at the end of the period of oscillation and when this occurs, the peach will drop deeper over the finder wheel seating itself firmly upon the upper segment thereof with its seam in alignment with the plane of said wheel. Thus, when the oscillations of the finder wheel come to a halt at the end of sector *c* of the annular cam 172, the peach seated thereon is properly oriented, its stem blossom axis being in vertical position with the stem cavity pointing in downward direction and the seam of the fruit extending in a tangential plane with respect to the rotary course of the orienting machine (Figs. 31A, B, and C).

The blossom ends of peaches and other fruit of the type here under consideration frequently exhibit surface irregularities, such as dimples and/or peaks, which may engage the finder wheel 155 during the scanning phase of the described orienting process and frustrate the action of the drive cones 130, 135 in somewhat the same manner as if the finder wheel had been engaged by the stem cavity of the fruit. To avoid such action in the operation of the described fruit orienting mechanism, the present invention comprises means effective to dislodge the finder wheel from irregularities of this type, yet ineffective to dislodge said wheel from engagement within a proper stem cavity should such an engagement have been accomplished during the initial stages of the orienting process.

For this purpose, the lower end of each of the vertically slidable shafts 159 is provided with a roller 179 which is adapted to engage a camming ridge 180 arranged at the bottom 103 of the channel 102 (Figs. 2 and 4). A compression spring 181 (Figs. 11, 12 and 13) around the shaft 159 and disposed between the bottom face of the upper bearing 160 and a collar pinned to said shaft 159 directly above the gear 165 urges said shaft in downward direction to maintain said roller 179 in contact with the contour of the camming ridge 180.

The camming ridge 180 (Fig. 6) commences with a short ascending slope 183 at a point some distance behind the beginning of sector *a* of the internal cam 172 in the direction of movement of the turret 115 and extends over an arc of about 300 degrees around the center shaft of the machine, terminating with a short downwardly inclined slope 184 at a point in radial alignment with the end of sector *b* of said internal cam. The initial sector of the ridge 180 runs at an even height to a point in radial alignment with the first of the recesses 173 in sector *b* of the internal cam 172, as shown in Fig. 6, and said height is so dimensioned that when the rollers 179 ride on said ridge, the finder wheels are maintained at an altitude in which their rotational axes are of the same level as the rotational axes of the drive cones, with their presumptive fruit contact points sufficiently high to maintain a fruit placed upon the unit 125, in engagement with the upper forward quadrants of said cones, as illustrated in Figs. 11, 13, and 26. In radial alignment with the first of the recesses 173, however, the camming ridge 180 rises above its previous level in the form of a hump 185 of limited length which is adapted to briefly raise the finder wheel to a somewhat higher level, as illustrated in Fig. 12. Additional humps of the same or similar construction may be provided at later points of the camming ridge 180 and may be radially aligned with selected ones of the recesses 173 in the internal cam 172 but are preferably omitted from the final stretches of the camming ridge 180, as shown in Fig. 6.

Thus, as a roller 179 ascends the initial slope 183 of the camming ridge 180, it raises its finder wheel 155 to the position shown in Fig. 11 in which it is maintained until said roller 179 encounters a hump 185. Whenever this occurs, the wheel 155 is briefly jolted above its normal level, as illustrated in Fig. 12, so that an upward jolt is imparted to the fruit which has been found effective to disengage the finder wheel from any irregularities in the surface of the fruit other than the actual stem indent.

Having reference to Fig. 6, it should be noted that the jolting humps 185 on top of the camming ridge 180 are all shown in angular alignment with recesses 173 in the camming surface of the annular cam 172. As previously explained, these recesses 173 effect the intermittent clockwise turns in the position of the finder wheels 155 which accompany the reversals of the outer drive cones 135 that steer the fruit into new scanning planes. As will be seen from Figs. 7 to 10 in combination with Figs. 11 to 14, however, the actuating mechanisms of the described orienting units are so arranged that the roller 170 which drops into the recesses 173 trails behind the roller 179 at the bottom of the swivel shaft 159 which supports the finder wheel 155. As a result thereof, the dislodging jolts imparted by the humps 185 will occur before, and be completed by, the time the finder wheel swings into its clockwise position and the outer drive cone 135 reverses its course to shift the fruit into a new steering plane. The purpose of the described sequence in the occurrence of dislodging jolt and steering operation is to release any obstruction in the moveability of the fruit before the orienting mechanism acts to steer said fruit into a new scanning plane, in order that said steering operation may be fully effective and may cause the immediately subsequent scanning operation to occur in a new plane. If the described dislodging jolt were applied after a steering operation and said steering operation had remained ineffective, the drive cones might roll the released fruit substantially along the previously scanned meridional circle thereof which would not only be useless, but might result in entanglement of the finder wheel with the same surface irregularity of the fruit that caused the original obstruction.

When the roller 179 finally descends the downwardly inclined slope 184 at the end of the camming ridge 180, the gravity of the assembly and the spring 181 cause shaft 159 to slide downwards within its bearings 160 and 161 as far as eventual contact of the gear 165 with the lower bearing 161 will permit. The resultant drop in the level of finder wheel 155 causes a fruit positioned with its stem cavity upon the upper segment of said wheel to tilt forwardly out of contact with the drive cones 130, 135, and with the rolller 179 hanging freely in the air above the bottom of the runway 102 (Fig. 14), the swivel shaft may now be oscillated freely in both directions by the undulant sector *c* of the annular cam 172, as previously explained, in order that the wheel 155 may find the deepest spot in the stem indent of the fruit (Figs. 30A, B, and C).

Each orienting unit 125 is provided with guard means to prevent fruit from dropping off as it is being delivered onto said units from the hopper A or as it is being agitated by movement of the described components 130, 135, 155. For this purpose, a confining surface 186 is arranged between the drive cones of each orienting unit (Figs. 1 and 5) and ascends obliquely from a point near the rotational axis of said cones in rearward direction. Said surface may be formed by a strip of metal and may form part of a trapezoidal frame 187, the bottom leg of which is bolted to the horizontal surface 118 of the two-stepped lip 116 formed in the peripheral region of the turret 115, as shown in Fig. 11.

Forwardly of the drive cones, a guard railing 188 is arranged around each of the finder wheels 155 which is composed of two parallel rails of semi-circular shape. These rails are held in a vertically spaced relation by a number of suitable balusters 191 (Figs. 11 to 14) and extend from close to the base of the outer cone 135 to close to the base of the inner cone 130, as best shown in Fig. 5.

Since fruit delivered improperly from the hopper A onto the orienting units 125 may position itself between the finder wheel 155 and the guard railing 188 and thus be out of the reach of the drive cones 130, 135, the guard railing 188 may be arranged to oscillate continuously in horizontal orbits of sufficient radius to shift such mispositioned fruit into the proper orienting position wherein it is seated between the drive cones 130, 135, and the finder wheel 155.

For this purpose, radially extending arms 192 (Figs. 1 and 2) support the guard railings 188 from a common ring or collar 193 that is disposed around the inner vertical lip 117 of the turret 115. The ring 193, in turn, is supported by three brackets 194 spaced equal angular intervals apart, and said brackets are rigidly attached to the outer races of three floating ball bearings 196 located in suitable niches 197 provided in the inner vertical lip 117 of said rotor 115, as shown in Fig. 15. Disposed within the inner race of each of said floating bearings 196 is a stub shaft 199 which is eccentrically mounted upon a disc 200 supported upon the upper end of a vertical shaft 201. This shaft is suitably journalled within the inner lip 117 of said turret and extends downwardly through said lip into the space between said turret and the stationary bottom disc 101 (Fig. 2). Pinned to the lower end of said shaft 201 is a sprocket wheel 202 which meshes with a sprocket track 203 provided around the inner wall 104 of the channel 102 formed in said stationary bottom disc 101.

Whenever the machine operates and the turret 115 revolves, the three sprocket wheels 202 are rolled around the track 203 turning the shafts 201 with the discs 200. In consequence thereof, the eccentric stubs 199 revolve around the centers of their respective discs in circles of a size determined by their eccentricity. All three of said discs 200 and their eccentric stubs 199 are so adjusted relative to one another that they rotate in perfect alignment, that is to say, the diameters of said discs intersecting their respective stubs are initially adjusted to parallel alignment and remain permanently in this relation as said discs revolve during operation of the machine. As a result of this aligned movement of said eccentric stubs, the ring 193 supported from the outer races of the floating bearings 196 is subjected to an oscillatory milling motion which is transmitted to the guard railings 188. Therefore, as the turret 115 revolves and the many orienting units 125 are carried around the main shaft of the machine, the guard railings continuously change their position relative to their respective units shifting from outwardly displaced positions through properly centered positions to inwardly displaced positions and vice versa, while at the same time moving closer to or farther away from said units, as is shown in Fig. 1, wherein consecutive units 125 illustrate successive stages in the relation between the guard railings 188 and the components 130, 135, and 155.

Lest fruit delivered onto the orientation units 125 be bruised by the edges of the finder wheels 155 or the ridges of the drive cones 130, 135 as it drops from the hopper A, a circular ring 205 is arranged around each of said wheels 155, as shown in Figs. 1 and 5. This ring is adapted to be raised automatically above the crest of its associated wheel 155 at the station where the fruit is supplied to the machine, but is maintained at about the level of the wheel center during the actual orienting operations to expose a sufficiently large segment of the wheel 155 for the stem indent of a peach or like fruit to seat itself securely thereon.

To perform in this manner, each of said rings 205 (Fig. 11) has a vertically depending arm 206 which is pivoted at 207 near its upper end to one of the shanks of a frame 208 (Fig. 10) of horse shoe shape that is rigidly mounted in a forwardly declined position upon a vertical shaft 210 (Figs. 13 and 14). This shaft is firmly seated in the upper end of a tubular extension 211 (Fig. 16) that is slidably disposed within a bushing 212 rigidly supported from the previously described mounting plate 163. Over part of the travel of each orienting unit 125 around the main shaft of the machine, the vertical position of the shaft 210 and, hence, of the ring 205, is controlled by a camming ridge 215 (Fig. 6) which is provided along the bottom 103 of the runway 102 formed in the stationary bottom disc 101 and is adapted to engage a roller 216 pivoted to the lower protruding end of the tubular shaft extension 211. Said roller 216 is maintained in contact with said camming ridge 215 by means of a compression spring 217 (Fig. 16) which is encased in the hollow interior of said tubular extension 211 and is held between the closed bottom thereof and a transverse pin 218 anchored in the wall of said bushing 212 and protruding through diametrically opposite slots 219 in said tubular extension 211. Since the transverse pin 218 is immovable, the force of the spring 217 is exerted against the bottom of the tubular extension 211 urging it to slide downwardly relative to its bushing 212. However, whenever the camming ridge 215 engages the roller 126, said shaft extension 211 is held in the elevated position illustrated in Fig. 11 in which the horse shoe frame 208 maintains the ring 205 above the highest point of the oscillating wheel 155, as illustrated in Figs. 11 and 25B and C. To keep the protective ring 205 in the perfectly horizontal position illustrated in said Fig. 11, the lower end of its depending arm 206 is bent slightly in backward direction, as shown at 220, and a camming stud 221 suitably supported from the mounting plate 163 is provided at the correct altitude to be engaged by said backwardly curved lower end 220 of arm 206 whenever the camming ridge 215 raises the ring 205 to the extreme elevated position illustrated in Fig. 11.

The most important function of the ring 205, however, is to lift the oriented fruit from the finder wheel 155 after completion of the orienting operations and present it in properly oriented condition to the grasping arms of the transfer mechanism C. For this purpose, the camming ridge 215 (Fig. 6), which lifts the ring above the crest of the finder wheel 155 in the manner described above, commences with a gently rising slope 222 at a point in angular alignment with the end of the undulant sector *c* of cam 172 which marks the end of the orienting operations. Thus, after an orienting unit has been subjected to all the actuation provided by the annular cam 172 and the camming ridge 180, its roller 216 at the bottom of the composite shaft structure 210, 211 encounters the gradually ascending slope 222 of the camming ridge 215 causing the ring 205 to be gently raised to the elevated horizontal position illustrated in Figs. 11 and 31B and C in which the oriented fruit seated thereon may readily be grasped by the arms of the transfer mechanism C without interference from the finder wheel 155, the drive cones 130, 135, or the guard railing 188.

After the arms of the transfer mechanism C have moved the oriented fruit from the unit 125, the ring 205 is preferably maintained in the elevated position illustrated in Fig. 11 until said unit has passed the hopper station and has received a new fruit from the supply hopper A. Thus, while the machine of our invention may comprise two separate camming ridges 215, one for elevating the rings 205 at the point where the orienting units are supplied with fruit from the hopper A (Figs. 25A, B, and C) and another one at the point where the oriented fruit is taken over by the transfer mechanism C (Figs. 31A, B, and C), it is more convenient to provide a continuous camming ridge extending from the above defined point in angular alignment with the end of the undulant cam sector 172*c* in counterclockwise direction to a point beyond the hopper station of the machine but prior to the first of the recesses 173 of the cam sector 172*a*. At this latter point the camming ridge 215 may terminate with a steep downwardly inclined slope 223, as shown in Fig. 6. As the roller 216 descends said steep slope 223, the spring 217 within the tubular shaft extension 211 expands and forces said extension downwardly within the bushing 212 to an extent determined by the vertical depth of the slots 219 that are slidingly engaged by the transverse pin 218. The depth of these slots is so dimensioned that the ring 205 drops to the center level of the finder wheel 155 so that at least half of the circumference of said wheel rises above said ring (Figs. 27A, B, and C) and is now free to enter the stem indent of whatever peach or other fruit may have been placed upon the ring 205 at the hopper station A. In order that the ring 205 may assume a horizontal position when lowered in the described manner, its forward segment is provided with another downwardly projecting stud 224 which rests upon a horizontal platform 159 that is rigidly supported from the shaft 159 of the finder wheel 155.

Whenever an orienting unit 125 reaches the counterclockwise end of the rocking ridge 180 and its roller 179 descends the slope 184 thereof, the shaft 159 and the platform 158 drop to the position illustrated in Fig. 14. As a result thereof, the forward sector of the ring 205 loses its normal support and is pulled downwards by a spring 225 disposed between said forward sector and an appropriate point of the horse shoe frame so that said ring assumes a forwardly declined position substantially parallel to said horse shoe frame, as illustrated in Fig. 14 and in Figs. 30B and C. This change in the position of the ring 205, at the time the roller 179 drops from the camming ridge 180 and lowers the finder wheel 155, as previously described, aids in disengaging the fruit from the drive cones 130, 135 and tends to maintain said fruit out of contact with said cones while the lowered wheel 155 is oscillated to find the suture plane of the stem cavity of the fruit; and by the time the oscillations of the finder wheel 155 have come to an end and said wheel has assumed its normal position substantially within the symmetrical plane of its associated drive cones, i.e., within a plane normal to the axes of rotation of said cones, the roller 216 encounters the gently rising slope 222 at the clockwise end of the camming ridge 215 and lifts the ring 205 above the wheel 155 to present the oriented fruit to the grasping arms of the transfer mechanism C, as explained hereinbefore and as illustrated in Figs. 31A, B, and C.

As previously stated, the described orienting machine is supplied from a hopper A which is adapted to deliver the fruit individually onto the circulating orienting units 125 of the machine. Such a hopper may be of the type disclosed in the copending application of Albert R. Thompson for Apparatus for Feeding and Orienting Pears, Serial No. 571,146, filed January 3, 1945. Briefly, it comprises an obliquely positioned stationary valve plate 231 (Figs. 1 and 4) which has an aperture 232 near its upper edge at a point above the circular path of the orienting units 125. Disposed concentrically above the valve plate 231 is a rotating drum 233, the bottom plate of which is provided with a plurality of equi-spaced tubular pockets 234 arranged at equal angular intervals along the circumference of said drum. Said pockets have open bottoms and both said pockets and the aforementioned aperture 232 are of a diametrical size that will admit only a single fruit at a time. Thus, when peaches are delivered in bulk into the drum 233 at the lower portion thereof and said drum is set into motion, they will drop individually into said pockets 234 and be carried to the upper portion of the inclined drum; and, as soon as a loaded pocket registers with the valve aperture 232, the peach contained in said pocket drops through said aperture onto a tangentially positioned slide 235 (Fig. 4) which guides it to a point directly above the path of the orienting unit 125 from where it will fall on to whatever unit may happen to pass underneath.

It will be understood that the rotational speed of the drum must be carefully synchronized with the speed of the turret 115 in order that the peaches dropping individually from the hopper 230 may be accurately delivered into successive ones of the circulating orienting units 125. In the particular embodiment illustrated in the drawing the rotating drum 233 (Fig. 4) is bolted at its center to a short shaft 238 which is journaled in a bearing 239 rigidly supported in the center of the stationary valve plate 231. The protruding lower end of the shaft 238 carries a bevel gear 240 which meshes with another bevel gear 241 fixed on a horizontal shaft 242 which is operatively connected through a sprocket chain 243 with a power shaft 244 (Figs. 1 and 4).

To prevent overloading of the hopper drum 233, the flow of fruit into said drum may be automatically controlled by a gate (not shown) that is caused to close as soon as the weight of the hopper exceeds a predetermined limit, and which is arranged to reopen as soon as the weight of the hopper drops below said limit, as likewise disclosed in the aforementioned patent application Serial No. 571,146.

The transfer mechanism C (Figs. 1, 2, and 17) of the machine of the present invention is located at a point above the initial portion of the camming ridge 215 which lifts the rings 205 of the orienting units above the finder wheels 155 thereof. Said transfer mechanism comprises a vertically positioned rotatable carrier plate or transfer turret 250 which holds five bearings 251 arranged along its circumference at equal angular intervals, as shown in Fig. 17. Journalled in, and projecting beyond said bearings at either side of the carrier plate 250, are short horizontal shafts 252 and firmly clamped to the outwardly projecting end of each of said shafts is a fruit grasping transfer unit 255 which possesses a pair of downwardly extending arms 256 and 257, respectively, as best shown in Fig. 2.

The transfer turret 250 is rotatably mounted upon a short stationary shaft 258 which is rigidly held in horizontal position a predetermined distance above another horizontal shaft 259 by means of a suitable clamp 260. The last mentioned shaft 259 protrudes radially into the interior of the cupola 107 and is securely held in a stationary horizontal position by brace 261 depending from and bolted to the ceiling of the cupola 107. Rotatably mounted upon the shaft 259 (Fig. 2) within the cupola 107 is a gear 262 which meshes with the previously described horizontal gear wheel 114 that is driven from the main drive shaft 110 to operate the main turret 115. The gear 262 possesses a lateral sleeve 263 that protrudes through the wall of the cupola 107, and keyed upon the outwardly projecting end of said sleeve is a spider 265 that has as many spokes 266 as there are bearings 251 supported by the transfer turret 250. At points radially spaced from the center of the spider 265 by a distance equal to the radial distance between the center of the transfer turret 250 and its shafts 252, each of said spokes carries an outwardly directed horizontal stud 267 which is pivotally anchored in the lower end of a downwardly directed arm or link 268 that is firmly mounted upon the rearwardly projecting end of a respective one of the transfer turret shafts 252. Thus, when the gear wheel 114 is in rotation and the main turret 115 carries the orienting units in counterclockwise direction around the stationary center shaft of the machine, as viewed from the top, said gear wheel 114 turns the gear 262 and, hence, the spider 265 in counterclockwise direction, as viewed from the periphery of the machine. As the spider 265 revolves in this manner, the links 268 pull the transfer turret 250 in the same direction remaining at all times parallel to the plane determined by the rotational axes of the transfer turret and said spider; and due to the fact that said connecting links 268 are firmly mounted upon the shafts 252 journalled in the transfer turret bearings 251 but are freely rotatable on the studs 267 held by the spider spokes 266, the transfer units 255 are all maintained in an identical position which is so adjusted that their arms 256, 257 extend in downward direction as the revolving spider 265 swings the transfer turret 250 around its stationary shaft 258.

As apparent from Figs. 1 and 2, the transfer turret 250 is arranged to turn in a vertical tangential plane with respect to the orienting or main turret 115 at such a radial distance from the center of the machine that the transfer units 255 operate directly above the path of the orienting units 125 with the arms 256 and 257 straddling said path at the pickup point. The arms 256 and 257 terminate into inwardly directed fruit grasping surfaces or jaws 271 and 272, respectively (Figs. 2 and 17), and each transfer unit comprises means maintaining said arms sufficiently spread apart for said jaws to pass freely on either side of a peach of maximum size, combined with means automatically effective, at or near the lower point in the path of each transfer unit, to yieldably urge said arms into a closed position in which their jaws firmly grip an intermediately positioned oriented fruit at either side of its suture plane.

For this purpose, the arms 256 and 257 (Figs. 21 and 22) are firmly mounted upon the protruding ends of two parallel shafts 274 and 273, respectively, which are journalled in and extend through the side walls 275 and 276 of said transfer units. In the particular embodiment of the invention illustrated in the accompanying drawings, said arms 256 and 257 are arranged to traverse one another in scissor fashion, as best shown in Figs. 19 and 20, so that the arm 256 of the inner jaw 271 is mounted upon the outer shaft 274 while the arm 257 of the outer jaw 272 is mounted upon the inner shaft 273. We prefer such an arrangement because the increase in the length of the arms, thus obtained, reduces the operating angle over which the shafts must turn to move their jaws from open to gripping position. Also, with the arms crossing one another in this manner, their jaws will descend to progressively lower levels as the arms approach one another, and thus will come into contact with fruit of smaller size at lower levels than with the larger specimens, so that the mechanism may be designed to grip all fruit at its equatorial belt, halfways of its natural height, whether a particular specimen is large or small. Additionally, the arms 256 and 257 are preferably bent backwardly, as shown in Fig. 17, to place the jaws 271, 272 directly below the center of the transfer units from which they are supported. As a result of this arrangement, the individual transfer units may be grouped along a circle of relatively small diameter without interference between the gripping arms and the body portions of consecutive units as they are circulated around the center shaft of the transfer turret with their arms maintained in a downwardly extending position.

Firmly mounted upon each of said shafts intermediately of the walls 275, 276 are two enmeshed tooth segments 277 and 278, respectively, and a spring 279 tensioned between an eye 280 on the outer segment 278 and an eye 281 in the wall 276 below the inner segment 277 (Fig. 21) urges said outer segment in clockwise direction which, in turn, urges said inner segment in counterclockwise direction, as viewed in Fig. 19, to spread the jaws 271, 272 sufficiently apart to freely pass the maximum sized specimens of the fruit for which the machine may be designed. To close the jaws 271 and 272 and thus grip an intermediately positioned fruit, each transfer unit comprises automatically effective means to swing the outer tooth segment 278 in counterclockwise direction against the urgency of the spring 279. For this purpose, the outer segment is provided with a lateral stud 285 (Figs. 19, 20, and 21) which is engaged by the forked end 286 of a plug 287 that is rigidly attached to and forms one of the end walls of a cylindrical container 288. The opposite end wall of the container 288 is formed by a collar 289 within which is slidably disposed another plug 290 having an outwardly protruding head which is forked and forms two prongs 291. Said prongs are journalled on a short shaft 292 that is held in a horizontal position by the shanks of a yoke shaped bracket 293 which is rotatably supported from the shaft 273 of the inner tooth segment 277. Interiorly of the container 288 the plug 290 forms a tennon 294 which slidably engages the hollow interior of an inwardly directed tubular projection 295 of the opposite plug 287, as shown in Figs. 19 and 20. Coiled around said tennon 294 and projection 295 is a heavy expansion spring 296 which bears against the plug 287 and a collar 297 that is arranged around the tennon 294 and which has a flange 298 of a larger diameter than the aperture of the previously mentioned collar 289 within which the plug 290 is slidably disposed. This expansion spring 296 is sufficiently stronger than the contraction spring 279 which urges the arms 256 and 257 into open position, to ordinarily permit the described spring box assembly 290, 296, 287 to act like a rigid pitman whenever force is applied against its plug 290 to shift the outer tooth segment 278 in counterclockwise direction against the urgency of said contraction spring 279.

Intermediately of the prongs 291 of the slidable plug 290 the shaft 292 carries a roller 300, as shown in Figs. 21 and 22, and with the two tooth segments 277, 278 in the position illustrated in Fig. 19, in which the grasping arms 256, 257 are idly spread apart, said roller 300 is seated in the upper one of a pair of sequentially adjacent concave recesses 301 and 302 provided in the free forward edge of a lever arm 303 which is firmly mounted upon a horizontally positioned operating shaft 304 that is journalled in the side walls 275, 276 of the transfer unit. Said free end of the lever arm 303 slants somewhat to the right, as viewed in Figs. 19 and 20, so that the lower concave recess 302 is positioned somewhat farther away from the axis of the operating shaft 304 than the upper recess 301.

When the shaft 304 is operated to swing the lever arm 303 in counterclockwise direction and the roller 300 is forced across the dividing peak 307 into the lower recess 302, the swinging bracket 293 is pushed somewhat to the right, as viewed in Figs. 19 and 20, and transmits its shift through the connecting link formed by the plug 290, the spring 296 and the plug 287 to the outer tooth segment 278 which is forced to yield in counterclockwise direction due to the greater strength of the spring 296 as compared with the spring 279. As the outer tooth segment 278 swings in counterclockwise direction, it causes the inner tooth segment 277 to swing over a corresponding angle in clockwise direction and, as a result thereof, the arms 256 and 257 and their jaws 271 and 272, respectively, approach one another and assume the position shown in dotted lines in Fig. 20 wherein they will remain—unless a positive exterior force restores the lever arm 303 to its initial position—since the roller 300 is unable to negotiate the dividing peak 307 against the pressure exerted by the contraction spring 279, which maintains said roller 300 within the deepest portion of the lower recess 302. To avoid any play or looseness between the roller 303 and the upper recess 301 whenever the mechanism is in open position, a small compression spring 308 may be arranged within the tubular projection 295 of the container plug 287 to bear against the tennon 294 of the slidable container plug 290.

The described mechanism should be so dimensioned that with the roller 300 seated in the lower recess 302, the distance between the jaws 271 and 272 is slightly smaller than the equatorial diameter of the smallest sized specimen of the fruit for which the machine is designed. Thus, when a fruit is positioned between the jaws and actuation of the operating shaft 304 shifts the lower recess 302 into engagement with the roller 300, said jaws will encounter said fruit and be restrained from reaching their closest position, whether said fruit be large or small (Fig. 20). As a result thereof, the segment 278 resists the force developed by the positive lateral shift of the roller 300 as soon as the claws 271, 272 contact the fruit, and under the force and counterforce set up in this manner at opposite ends of the power transmitting link 290—296—287, the spring 296 of said link is compressed and permits the plug 290 to slide deeper into the container 288, thus shortening the length of said link to an extent determined by the diameter of the fruit. By properly proportioning the strength of the spring 296 relative to the spring 279 and relative to the surface resistivity and the weight of the fruit to be transferred, the described arrangement may be adapted to dependably grip the smallest specimen of said fruit without crushing or otherwise injuring the largest specimen thereof.

The machine of the present invention comprises means automatically effective to close and open the jaws of the transfer units 255 at predetermined points of their circular course around the shaft of the transfer turret 250 and for this purpose the operating shafts 304 of the transfer units are arranged to project beyond the walls 275 and 276, as shown in Fig. 23. Firmly mounted upon one of the projecting ends of each shaft 304 is an actuating arm 310, the free end of which is provided with a horizontal cross beam 311 in the manner of a T. The upwardly directed face of said cross beam is formed into a camming surface 312 having a forwardly positioned ascending slope 312*a* which culminates in a rounded peak 312*b*, and supported from the stationary cupola 107 of the machine at a point near the lowest level of the circular course followed by the transfer units is a camming roller 314 (Fig. 2) which is arranged to engage the ascending slope 312*a* of the camming surface 312, as a unit 255 approaches its lowermost point, and push the actuating arm 310 in downward direction as it strikes against the peak 312*b*. The resultant rotation of the shaft 304 rocks the camming lever 303 from the position shown in Fig. 19 in which its upper recess 301 engages the roller 300 into the position shown in Fig. 20 in which its lower recess 302 engages said roller, and thus effects closing of the jaws 271 and 272 in the manner previously described to resiliently grip whatever fruit may lie upon the elevated ring 205 of an orienting unit passing underneath. As the transfer unit moves on, it lifts the fruit held between its claws from the orienting unit and transfers it in oriented condition to the conveyor D of a fruit preparation machine, or the like. In the exemplary embodiment illustrated in the accompanying drawings (Figs. 17 and 18) said conveyor is formed by an endless belt 320 which carries a sequence of knives 321 each composed of a forwardly positioned arcuate blade 322—that is preferably serrated—and a rearwardly positioned lobe 323. The transfer units 255 and the slicing knives 321 are arranged to move in oppositely ascending partially overlapping arcs with the knives 321 passing between the claws 271, 272, and the transfer mechanism C and the conveyor D are synchronized in such a manner that a fruit picked up by said claws is carried against the blade 322 of an ascending knife for said blade to penetrate into said fruit along its suture plane until the lobe 323 seats itself into the stem indent thereof. At this moment the jaws 271, 272 are arranged automatically to open up and release said fruit which is carried away along the path of the endless conveyor belt 320 to its next processing station (not shown).

For autoamtic release of a fruit held by the jaws 271, 272 the operating shaft 304 carries another actuating arm 325 mounted upon its other projecting end, as shown in Fig. 23. Said arm possesses an obliquely ascending camming edge 326, as best shown in Figs. 19, 20, and 24, which is arranged to strike against another camming roller 327 supported from the cupola 107 (Fig. 17) whenever a transfer unit has risen to the point where the fruit should be released, as illustrated in Fig. 18. When said edge 326 strikes against said camming roller 327, the operating shaft 304 is rocked in clockwise direction, as viewed in Fig. 20, forcing the peak 307 of the lever arm 303 past and below the roller 300 which is thus returned to its initial position within the upper recess 301, as illustrated in Fig. 19. Hence, the counterclockwise pressure exerted upon the outer tooth segment 278 through the yieldable link 290—296—287 is withdrawn permitting the segments 277 and 278 to follow the urgency of the contraction spring 279 which opens the jaws 271, 272 to release whatever fruit they may have held.

Although the operation of the various component mechanisms of the fruit orienting machine has been explained concurrently with the description of the mechanical construction of the machine, the basic occurrences produced, or initiated, by the described mechanisms will briefly be recapitulated since it is primarily the sequential and/or composite effect of these occurrences upon the processed fruit which forms the gist and essence of the present invention, while the construction of the mechanisms may be modified without departing from the scope and spirit of the invention.

A fruit delivered through the valve aperture 232 of the hopper A onto the slide 235 (Fig. 4) drops upon the ring 205 of an orienting unit 125 passing underneath. At this point in the circular course of the orienting unit during the rotation of the main turret 115 around the center of the machine, the roller 216 engages the camming ridge 215 (Fig. 11) placing the ring 205 into an elevated position above the crest of the finder wheel 155 (Figs. 25A, B and C). As soon the the roller 216 of an orienting unit, thus loaded, descends the counterclockwise slope 223 of the camming ridge 215 (Fig. 6), the ring 205 drops to the level of the finder wheel center causing the fruit to position itself upon and between the drive cones 130, 135 and the finder wheel 155 with its center of gravity intermediately thereof (Figs. 26A and B). At this point, as during the greater part of the circular course of the orienting units, the roller 179 (Figs. 11 to 13) rides upon the camming ridge 180 (Fig. 6), placing the center of the finder wheel 155 at about the level of the rotational axis of the drive cones 130, 135 with the fruit contacting a point slightly below the crest of said wheel on the side facing said drive cones, as shown in Figs. 26A and B. In this position the ridges of the drive cones 130, 135 engage the surface of the fruit, and with both said cones turning in clockwise direction, as viewed in Fig. 26B, said fruit is revolved in counterclockwise direction around a diameter parallel to the rotational axis of the drive cones, as indicated by the arrows in Figs. 26A, B, and C, with the finder wheel 155 rolling upon its surface substantially along a meridional circle thereof and offering practically no resistance to the movement imparted to said fruit by the drive cones 130, 135.

However, it might have happened that the fruit did not seat itself properly between the drive cones 130, 135 and the finder wheel 155, but tilted forwardly or sideways and lodged itself between the finder wheel and the guard railing 188 beyond the reach of the drive cones 130, 135. In such an event the previously described oscillatory motion of the guard railing 188 along a horizontal orbit will quickly shift the fruit beyond the crest of the finder wheel into its proper orienting position, between said finder wheel and said drive cones.

As long as the drive cones 130, 135 revolve both in clockwise direction, the fruit is turned in counterclockwise direction with the finder wheel scanning a meridional circle of its surface. Since it is useless, however, to scan such a circle more than once, the outer drive cone will reverse its direction of movement after a predetermined period of time established by the design of the annular cam 139 which controls the movement of said outer drive cone in a manner previously described. The opposite rotational moments thus imparted to the fruit at adjacent quadrants of its lower hemisphere twist said fruit into a new position in which the previously scanned circle is angularly displaced from the rotational plane determined by the common clockwise movement of both said drive cones, so that the finder wheel 155 may scan another meridional circle of the fruit as soon as the outer drive cone resumes its clockwise direction of movement. The size of the angular interval between adjacent scanning circles may be approximately preestablished by properly dimensioning the speed and the time of the reversal in the operation of the outer drive cone; and to reduce the number of imponderables that may variably affect the degree of displacement of the fruit, the recesses 173 in the sector *b* of the annular cam 172 are arranged to swing the finder wheel 155 into a clockwise position (Figs. 27A, B, and C), whenever the outer drive cone reverses its movement, so that said wheel may be able to roll around its spindle 156 in response to the steering twist imparted to the fruit, thus minimizing any resistance that may affect the extent and direction of said twist. Hence, by properly dimensioning the angular intervals between adjacent meridional circles scanned by the finder wheel, the described arrangement may be adapted to scan the total surface of a fruit systematically so that the finder wheel is bound to encounter the stem indent of the fruit at some time during operation of the arrangement.

Figures 28A, 28B, 28C:
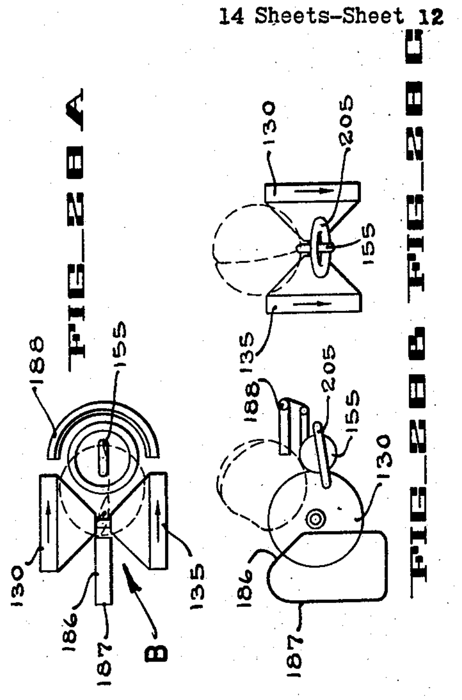

If, during the scanning motion of the fruit, the edge of the finder wheel 155 should engage a surface irregularity other than the stem cavity, such as the peaks or dimples frequenty found at or near the blossom end of apricots, peaches, and like fruit, and further motion of said fruit should thus be arrested, the upward jolts imparted to the finder wheel (Figs. 28A, B, and C), whenever the roller 179 negotiates one of the humps 185 on the camming ridge 180, will dislodge the fruit from the edge of said wheel and permit the scanning operation to continue. Eventually the finder wheel 155 is bound to encounter the stem cavity of the fruit whereupon said fruit will drop with said cavity over the upper segment of said wheel and reposition itself in such a manner relative to the finder wheel and the drive cones that said drive cones will actually hold the fruit with its stem cavity against the upper segment of the finder wheel, as illustrated in Figs. 29A, B, and C.

Since the finder wheel will most likely not have encountered the stem cavity along the suture plane of the fruit, said wheel is alternately turned in opposite directions on a vertical axis during the final phase of the orienting operations so that its upper segment may register with, and sink into, the deepest furrow of the stem cavity which follows the suture plane of the fruit. During this last stage of the orienting operations, the finder wheel is dropped to a somewhat lower level with the ring 205 tilting toward the railing 188 which causes the fruit to disengage itself effectively from the drive cones and lean against said railing 188, as shown in Figs. 30A, B, and C, so as to eliminate any interference from the drive cones during this final searching operation of the finder wheel. As soon as the edge of the finder wheel registers with the deep furrow which traverses the stem cavity in the direction of the suture line, the edge of said wheel sinks into said furrow and the fruit seats itself firmly upon said wheel, and, in consequence thereof, the suture plane of the fruit will be placed in a tangential position with respect to the circular course of the orienting units as soon as the oscillations of the finder wheel come to a halt at the end of sector *c* of the annular cam 172 (Fig. 6). At this point, the roller 216 climbs upon the camming ridge 215 and elevates the ring 205 above the crest of the finder wheel and said ring, in turn, lifts the oriented fruit from the upper edge of said finder wheel and presents it in oriented condition (Figs. 31A, B, and C) to the jaws of a grasping unit 255 for transfer to the conveyor D.

While the above described method of orienting indented fruit and the exemplary embodiment for performing the same comprises steps and mechanisms adapted to effect the scanning, steering, rocking, and suture finding operations required in accordance with the present invention in a particularly simple and effective manner, it will be understood that the present invention is not limited to the specific steps and constructions shown or described, since steps and mechanisms other than those specifically disclosed herein may be employed to perform in the same manner and with the same results. For instance, many mechanisms other than the particular camming arrangement shown may be adapted to appropriately control the operation of the reversible drive elements 135. Also, the drive elements 130, 135 need not necessarily have the form of fluted cones, but may be shaped in the manner of cylinders or even spheres. Thus, Figs. 32 and 33 illustrate a modified orienting unit of somewhat simplified construction which is collectively identified by the reference numeral 125'. The components of said orienting unit 125' bear the same reference numerals as the corresponding components of the previously described orienting units 125, but modified constructions are identified by a prime ('). The orienting unit 125' agrees in most respects with the orienting units 125, except that its guard railing 188' is formed by a single sickle-shaped plate which presents its concave edge to the finder wheel 155; further, while the guard railing 188 of the originally described orienting units is arranged to oscillate in horizontal orbits, the guard railing 188' of the modified orienting unit is stationary relative to the finder wheel in that it is bolted directly to the inner vertical lip 117 of the turret 115, as shown in Fig. 33; moreover, the inner edge of the sickle shaped plate 188' is disposed sufficiently far from the finder wheel 155 to support fruit that tips forwardly over the finder wheel in a position in which it is permanently removed from contact with the drive cones 130, 135. The described arrangement is of special advantage in the case of large specimens of fruit which rest heavily upon the drive cones after the finder wheel has found their stem indent and may, therefore, be rocked or shifted by said cones in a manner that may harmfully interfere with the final suture-finding phase of the orienting operations provided by the machine of our invention. With the guard railing 188' sufficiently far removed from the finder wheel, as illustrated in Figs. 32 and 33, large fruit, upon dropping with its stem indent over the finder wheel will tip forwardly over said wheel and come to rest against said guard railing 188' in a position permanently removed from the action of the drive cones so that the subsequent suture finding operation may occur without interference from said drive cones. Fig. 32 illustrates in phantom lines the position which a large sized fruit may assume upon the modified orienting unit 125' as a result of the described arrangement of the guard railing 188', after the finder wheel has found the stem indent of said fruit. It demonstrates clearly how the sickle shaped plate 188' holds the fruit in a position in which it is out of contact with the drive cones so that said cones are unable to unfavorable effect the suture finding operation.

It remains to add that while we have shown a particularly ingenious arrangement for automatically transferring the fruit from the orienting machine to its next processing station, it will be understood that the orienting machine of the present invention may be associated with other transfer mechanism of a type adapted to preserve the oriented position of the fruit during the transfer operation.

Having thus described the present invention and the manner in which it is to be performed, what we claim as new and desire to protect by Letters Patent is:

1. An orienting mechanism for peaches, apricots and like fruit having stem indents, comprising an element adapted to fit into the stem indents of such fruit, means for revolving a fruit in contact with said element, means engaging the surface of the fruit and intermittently effective to shift the axis of rotation of said fruit, and means for actuating the latter said means coacting with the aforesaid element to support the fruit.

2. An orienting mechanism for peaches, apricots and like fruit having stem indents, comprising a first element adapted to fit into the stem indents of such fruit, a driven second element engaging the surface of the fruit to revolve a fruit in a plane of rotation in contact with said first element, a driven third element engaging the surface of the fruit to revolve a fruit in conjunction with said second element and actuated to intermittently shift said fruit relative to its plane of rotation, and means for actuating the third element.

3. An orienting mechanism for peaches, apricots and like fruit having stem indents, comprising a first supporting element adapted to fit into the stem indents of such fruit, and second and third driven supporting elements adapted to engage the surface of the fruit and to revolve a fruit in a plane of rotation in contact with said first element, means for driving the second and third supporting elements, said third element drive means being operable to modify the driving contact between the third element and the surface of the fruit to intermittently shift said fruit relative to said plane of rotation.

4. Orienting mechanism for peaches, apricots and like fruit having stem indents, comprising an indent finder element adapted to fit into the stem indents of such fruit, a pair of rotating members arranged to revolve a fruit in contact with said element, means for driving the rotating members, and means for intermittently varying the rotational speed of said members relative to one another.

5. An orienting mechanism for peaches, apricots and like fruit having stem indents, comprising an indent finder element adapted to fit into the stem indents of such fruit, and a pair of rotating members arranged to engage the surface of a fruit in contact with said finder element, means for driving the rotating members and the drive means for one of said members being operable to momentarily reverse its direction of rotation at intermittent intervals.

6. Orienting mechanism for peaches, apricots and like fruit having stem indents, comprising a first supporting member adapted to fit into the stem indents of such fruit, a second supporting member spaced horizontally from said first member and adapted to frictionally engage the surface of a fruit in contact with said first member, means for driving the second supporting member to rotate the fruit, and means operably associated with said members and operating to shift the vertical position of said members relative to one another.

7. Orienting mechanism for peaches, apricots and like fruit having stem indents, comprising an indent finder member adapted to fit into the stem indents of such fruit, a plurality of rotating members horizontally spaced from said finder member and arranged to engage the surface of a fruit seated thereon in contact with said finder member, means for driving the rotating members, the drive means for one of said rotating members being operable at a variable speed relative to another rotating member, and means effective to momentarily raise said finder member relative to said rotating members.

8. An orienting unit for peaches, apricots and other fruit having stem indents, comprising first and second components arranged to form a support for a fruit to rest upon, said first component possessing a disc of a size adapted to fit into the stem indent of said fruit, and means for pivotally mounting the first component for rotation around a horizontal axis, and said second component having the form of a pair of rotatable bodies arranged at either flank of said disc for independent rotation around a common horizontal axis; means for rotating said bodies with their upper surfaces moving toward said disc to revolve said fruit within a plane of rotation with its surface in contact with said disc; means intermittently effective to momentarily reverse the direction of movement of one of said bodies to shift said fruit periodically relative to said plane of rotation; and means acting concurrently with said reversing means to momentarily swing said disc around a vertical axis into a position in which it may rotate in response to the shifting movement of said fruit.

9. An orienting mechanism for indented fruit, comprising a pair of drive elements arranged for rotational movement around a common horizontal axis, a finder element of a size adapted to fit into the stem indents of fruit of the type named, said drive elements and said finder element being sufficiently spaced apart horizontally to seat a fruit with its center of gravity above and intermediately of said components, means for rotating said drive elements to revolve said fruit with said finder element moving along a meridional circle of its surface, and means adapted to periodically vary the rotational speed of said drive elements relative to one another to align another meridional circle of said fruit surface with said finder element.

10. An orienting mechanism for indented fruit comprising a pair of fluted cones arranged for movement about a common horizontal axis, a disc of a size to fit into the stem indent of fruit of the type named and arranged to idle within the symmetrical plane of said cones about an axis of substantially the same level as the rotational axis of said cones, said cones and said disc being spaced apart horizontally over a distance proportioned to seat a fruit with its center of gravity above and intermediately of said components, means for rotating said cones at equal speed with their upper surfaces moving toward said disc to revolve said fruit around a diameter parallel to said axes with said disc rolling along a meridional circle of said fruit, means adapted to momentarily reverse the movement of one of said cones at intermittent intervals to shift an adjacent meridional circle of said fruit surface into operative alignment with said disc, and means concurrently effective with said reversing means to momentarily swing said disc into a position permitting free rotation thereof in response to said shifting movement of said fruit.

11. An orienting mechanism for fruit having a suture line originating with a stem indent, comprising a pair of drive elements arranged for individual rotational movement around a common horizontal axis, a rotatable disc of a size adapted to fit into the stem indents of fruit and arranged to idle within the symmetrical plane of said drive elements about a horizontal axis, said drive elements and said disc being spaced apart horizontally to seat a fruit with its center of gravity above and intermediately of said components, means for rotating said drive elements to revolve said fruit with said disc rolling along a meridional circle of the fruit surface, means adapted to momentarily vary the movement of one of said drive elements at periodic intervals to align another meridional circle of said fruit surface with said disc, and means effective upon a predetermined number of said reversals to oscillate said disc about a vertical axis.

12. Arrangement according to claim 11, wherein said vertical axis is arranged to intersect the presumptive point of contact of said wheel with a fruit seated upon said drive elements and said wheel.

13. An orienting mechanism for peaches, apricots and like indented fruit comprising an indent finder element adapted to fit into the stem indent of the fruit, a pair of drive elements spaced horizontally from said finder element and adapted to revolve a fruit seated on all three of said elements with its surface in contact with said finder element, means for driving the drive elements, an annular element disposed around said finder element below the crest thereof, and means effective upon a predetermined number of revolutions of said drive elements to elevate said annular element above the crest of said finder element.

14. An orienting mechanism for peaches, apricots and like indented fruit comprising an indent finder element adapted to fit into the stem indent of fruit of the type named, a pair of drive elements spaced horizontally from said finder element to form a seat adapted to support fruit with its center of gravity positioned above and intermediately of said three elements, means for rotating said drive elements to revolve a fruit seated thereon with its surface in contact with said finder element sequentially along adjacent meridional circles thereof, for said finder element to encounter the stem indent of said fruit and said fruit to drop with its stem indent over said finder element, an annular element disposed around said finder element below the crest thereof, and means effective upon a predetermined number of revolutions of said drive elements to elevate said annular element above the crest of said finder element in order to lift said fruit in oriented condition from said finder element.

15. An orienting mechanism for peaches, apricots, and like indented fruit comprising an indent finder element adapted to fit into the stem indent of fruit of the type named, a pair of drive elements horizontally spaced from said finder element to form a seat for a fruit to rest upon with its center of gravity positioned above and intermediately of said three elements, means for driving said drive means to revolve said fruit with its surface in contact with said finder element sequentially along different meridional, circles thereof, retaining means arranged around said finder element from one to the other of said drive elements, and means for oscillating said retaining means in horizontal orbits of limited radius.

16. An orienting mechanism for peaches, apricots, and like indented fruit comprising a vertically positioned disc freely rotatable about a horizontal axis, a pair of drive elements arranged at either side of the plane of said disc and spaced horizontally therefrom in the direction of said plane to form a seat for a fruit to rest upon with its center of gravity positioned above and intermediately of said disc and said drive elements, said drive elements being arranged to rotate individually around a common horizontal axis of substantially the same level as the axis of said disc, in a manner adapted to revolve said fruit with its surface in contact with said disc along a predetermined number of different meridional circles of its surface to enable said disc to find and sink into the stem indent of said fruit, and retaining means arranged around said disc from one to the other of said drive elements, said disc being arranged to drop to a somewhat lower level upon a predetermined number of revolutions of said drive elements to disengage said fruit from said drive elements and tilt it into contact with said retaining means.

17. Arrangement according to claim 16 including a ring disposed concentrically around said disc substantially at the level of its center, said ring being arranged to tilt away from said drive elements and toward said railing coincident with the lowering of said disc.

18. An orienting mechanism for peaches, apricots, and like indented fruit comprising a vertically positioned disc freely rotatable about a horizontal axis, a pair of drive elements arranged at either side of the plane of said disc and spaced horizontally therefrom in the direction of said plane to form a seat for a fruit to rest upon with its center of gravity positioned above and intermediately of said disc and said drive elements, said drive elements being arranged to rotate individually around a common horizontal axis of substantially the same level as the rotational axis of said disc in a manner adapted to revolve said fruit with its surface in contact with said disc along a predetermined number of different meridional circles of its surface, retaining means arranged around said disc from one to the other of said drive elements, said disc being arranged to drop to a somewhat lower level, upon a predetermined number of revolutions of said drive elements, to disengage said fruit from said drive elements, and tilt it into contact with said retaining means, and means effective to oscillate said disc about a vertical axis when in said lowered position.

19. Arrangement according to claim 18 including an annular element arranged concentrically around said disc below the crest thereof, and means effective to raise said anular element above the crest of said disc upon termination of the oscillations of said disc about a vertical axis.

20. An orienting machine for indented fruit comprising a stationary base, a main turret, a number of fruit orienting units supported from said turret each comprising a pair of drive elements mounted for individual rotary movement about an axis extending radially of said turret and a disc located substantially within the symmetrical plane of said drive elements and mounted for free rotation about an axis horizontally spaced from the rotational axis of said drive elements, and means operated by the movement of said turret relative to said base to turn one of said drive elements at a constant speed while turning the other element at a variable speed.

21. An orienting machine comprising a stationary base, a rotor disposed above said base, a plurality of orienting units supported from said rotor, each comprising first and second drive elements mounted for individual rotary movement about an axis extending radially of said rotor and an indent finder element spaced horizontally from said drive elements substantially in the symmetrical plane thereof, first actuating means operated by the movement of said rotor relative to said base to turn said first drive elements at a constant speed with their upper surfaces moving toward their respective finder elements, and second actuating means likewise operated by the movement of said rotor relative to said base to alternately turn said second drive elements in unison with their associated first drive elements and momentarily reverse their movement at predetermined intervals.

22. Arrangement according to claim 21 wherein said first actuating means comprises an annular rack supported from said stationary base and pinions enmeshed with said rack and operatively connected with respective ones of said first drive elements.

23. Arrangement according to claim 21 wherein said second actuating means comprises an annular rack arranged intermediately of said base and said rotor, a cam mechanism interposed between said rotor and said rack and adapted to oscillate said rack in a horizontal plane over a limited arc in response to movement of said rotor, and pinions enmeshed with said rack and operatively connected with respective ones of said second drive elements.

24. Arrangement according to claim 21 wherein said actuating means comprise a first annular rack supported from said stationary base, a second annular rack disposed concentrically within said first rack, a camming mechanism interposed between said rotor and said second rack and adapted to oscillate said second rack in response to movement of said rotor, first pinions enmeshed with said first rack, tubular shafts operatively connecting said first pinions with respective ones of said first drive elements, second pinions enmeshed with said second rack and shafts rotatably disposed within said tubular shafts and operatively connecting said second pinions with respective ones of said second drive elements.

25. An orienting machine for indented fruit, including a stationary base, a rotor, a number of orienting units supported from said rotor for circular movement along said base, each comprising first and second drive elements arranged for rotary movement about a horizontal axis extending radially of said rotor and an indent finder element possessing a disc spaced horizontally from said drive elements within the symmetrical plane thereof and arranged to idle about a horizontal axis and swing about a vertical axis, first actuating means operated by movement of said rotor relative to said base for constantly turning said first drive elements with their upper surfaces moving toward their respective discs, second actuating means operated by movement of said rotor relative to said base for alternately turning said second drive elements in unison with said first drive elements or in the reverse direction, and third actuating means operated by movement of said rotor relative to said base for momentarily swinging said discs, coincident with the reversal of their associated second drive elements, about said vertical axes in a direction determined by the opposing directions of movement of the upper surfaces of said drive elements.

26. A machine according to claim 25 wherein said third actuating means comprises an annular cam mounted upon said base and containing a plurality of equi-spaced recesses, a swivel shaft supporting each of said discs and a cam follower mechanism interposed between each of said swivel shafts and said cam and arranged to swing its associated shaft in the direction named when encountering one of said recesses.

27. A machine according to claim 25 including means actuated by the movement of said rotor relative to said base for momentarily lifting said discs to higher levels immediately prior to selected ones of the reversals of their respective second drive elements.

28. An orienting machine for indented fruit, including a stationary base, a rotor, a number of orienting units supported from said rotor for circular movement along said base, each comprising first and second drive elements arranged for rotary movement about a horizontal axis extending radially of said rotor and an indent finder element possessing a disc spaced horizontally from said drive elements and arranged to turn about a horizontal axis and swing about a vertical axis, first actuating means operated by movement of said rotor relative to said base for constantly turning said first drive elements with their upper surfaces moving toward their respective discs, second actuating means operated by movement of said rotor relative to said base for alternately turning said second drive elements in unison with said first drive elements or in the reverse direction, and third actuating means operated by movement of said rotor relative to said base and adapted to momentarily swing said discs, coincident with a predetermined number of the reversals of their associated second drive elements, about said vertical axes in a direction determined by the opposing directions of movement of the upper drive element surfaces and thereafter oscillate said discs in either direction about said vertical axes for a predetermined number of times.

29. A machine according to claim 28 wherein said third actuating means comprises an annular cam mounted upon said base and possessing a first sector containing a plurality of equi-spaced recesses along its circumference and a second sector formed by a sequence of alternately rising lobes and descending depressions of decreasing width and amplitude, a swivel shaft supporting each of said discs, and a cam follower mechanism interposed between each of said swivel shafts and said cam.

30. An orienting machine for indented fruit, including a stationary base, a rotor, a plurality of orienting units supported from said rotor for circular movement along said base, each comprising a pair of drive elements arranged for individual rotary movement about an axis extending radially of said rotor and an indent finder element spaced horizontally from and arranged at a predetermined level relative to said drive elements, and means actuated by the movement of said rotor relative to said base for lifting said finder elements momentarily to higher levels at predetermined points in the circular course of said units.

31. An orienting machine for indented fruit including a stationary base forming a circular runway, a rotor, a plurality of orienting units supported from said rotor for circular movement above said runway from a supply to a transfer station, each of said units comprising first and second drive elements mounted for individual rotation about a common horizontal axis, an indent finder wheel spaced horizontally from said drive elements and arranged to idle about a horizontal axis, a vertically positioned swivel shaft arranged to support said wheel, a ring disposed around said wheel, and a vertically slidable shaft arranged to support said ring, operating means actuated by movement of said rotor relative to said base for revolving the first drive elements of said units with their upper surfaces moving toward their respective finder wheels, operating means likewise actuated by movement of said rotor relative to said base for revolving the second drive elements of said units in unison with said first drive elements and momentarily reversing their direction of movement at equal intervals in the circular course of said units, camming means arranged along a first sector of said runway coextensive with said supply station for lifting said vertically slidable shafts and elevating said rings above the crests of their respective finder wheels, camming means extending over a second sector of said runway and adapted to momentarily turn the swivel shafts of said wheels at intervals coincident with the reversals of said second drive elements, camming means extending over a third sector of said runway and adapted to oscillate the swivel shafts of said finder wheels in both directions, and camming means extending over a fourth sector of said runway coextensive with said transfer station and adapted to again elevate said rings above the crests of their respective finder wheels.

32. Arrangement according to claim 31 comprising guard railings arranged concentrically around each of said finder wheels and operating means actuated by movement of said rotor relative to said base for continuously oscillating said guard railings in horizontal orbits.

33. Arrangement according to claim 31 wherein said swivel shafts are arranged to be vertically slidable, and including camming means provided along said runway and adapted to engage said shafts and maintain said finder wheels at a predetermined level relative to their associated drive elements, when said orienting units are carried through said second sector, but permitting said wheels to drop to a predetermined lower level when said orienting units travel through said third sector.

34. Arrangement according to claim 31 wherein said swivel shafts are arranged to be vertically slidable, and including a camming ridge provided along the second sector of said runway and adapted to engage said shafts and maintain said finder wheels above a predetermined level relative to their associated drive elements, said camming ridge possessing a plurality of humps at intermittent points along said second sector to momentarily elevate said finder wheels to a higher level.

35. An orienting unit for indented fruit comprising a pair or drive elements mounted for individual rotary movement about a common horizontal axis, an indent finder element positioned forwardly of and spaced horizontally from said drive elements, a vertically slidable supporting structure adapted to support said finder element at different altitudes, a ring element disposed around said finder element, a vertical post pivotally supporting said ring element at a rearward sector thereof, propping means interposed between a forward sector of said ring element and a point of said supporting structure and effective, at a predetermined altitude of said finder element relative to said drive elements, to hold said ring element in a horizontal position below the crest of said finder element, and means for cyclically varying the vertical position of said finder element from said predetermined altitude to a lower level at which said ring element assumes a forwardly tilted position.

36. An arrangement according to claim 35 wherein said supporting structure is rotatable in a horizontal plane, and including cyclically operable means effective to oscillate said finder element when positioned at said lower level.

37. Arrangement according to claim 35 wherein said post is arranged to be vertically slidable, and including cyclically operable means to raise said ring element at predetermined intervals above the crest of said finder element, and means adapted to maintain said ring element in horizontal position when raised in this manner.

38. A fruit orienting machine of the type described comprising a stationary base, a rotor, a plurality of orienting units supported from said rotor for movement along said base, each having a pair of drive elements, an indent finder element spaced horizontally from said drive elements and a guard railing extending around said finder element from one to the other of said drive elements, and means for oscillating said guard railings in horizontal orbits comprising a circular gear track supported from said stationary base, a plurality of angularly spaced gears in mesh with said track, a vertical shaft journalled in said rotor for each of said gears, a disc firmly mounted upon each of said shafts, a stub-shaft eccentrically mounted upon each of said discs, a floating bearing journalled on each of said stub-shafts, and a ring disposed around said rotor and rigidly attached to each of said bearings, said ring being arranged ot support all of said guard railings.

39. An orienting mechanism for peaches, apricots, and like indented fruit comprising an indent finder element adapted to fit into the stem indent of fruit of the type named; a pair of drive elements arranged at one side of said finder element and spaced horizontally from said finder element to form a seat for a fruit to rest upon with its center of gravity positioned above and intermediately of said three elements, means for driving the drive means to revolve said fruit with its surface in contact with said finder element, and retaining means arranged at the opposite side of said finder element at points sufficiently spaced from said finder element to maintain fruit supported from said finder element and leaning against said retaining means out of contact with said drive means.

40. In a device of the class described, means for conveying a whole peach at a constant rate along a predetermined path, peach orienting means carried by said conveying means for engaging the periphery of the traveling peach and tending to rotate said peach simultaneously about a plurality of angularly disposed axes, said peach orienting means including an orienting member having an elongated surface shaped to enter the stem indent of the peach in the direction of its long axis when aligned with the suture plane of the peach.

41. Means for orientating indented fruit comprising means for progressing a fruit over a path, means for rotating a fruit in vertical planes while being progressed, and separate means tending to simultaneously rotate said fruit in horizontal planes.

42. Means for orientating elongated indented fruit comprising means for transporting said fruit, rotating means contacting the bottom of said fruit while being transported to rotate said fruit in vertical planes, and separate means tending to simultaneously rotate said fruit in horizontal planes.

43. An orienting machine for indented fruit, including a stationary base, a rotor, a plurality of orienting units supported from said rotor for circular movement along said base, each comprising a pair of drive elements arranged for individual rotary motion about an axis extending radially of said rotor and an indent finder element possessing a wheel spaced horizontally from said drive elements and arranged to idle about a horizontal axis of substantially the same level as the axis of said drive elements, and means actuated by the movement of said rotor relative to said base for lifting said wheels momentarily to a higher level at predetermined points in the circular course of said units and thereafter lowering said wheels to a lower level over a limited portion of the circular course of said units, each of said wheels being mounted upon a vertically positioned sliding shaft having a roller at its bottom which is adapted to ride upon an arcuate camming ridge mounted upon said base and extending over the greater part of a full circle, said camming ridge possessing a plurality of upwardly directed humps at intermittent points of its circumference.

References Cited in the file of this patent

UNITED STATES PATENTS

| | | |
|---|---|---|
| 1,492,970 | Elliott | May 6, 1924 |
| 1,887,211 | Martimer | Nov. 8, 1932 |
| 1,905,476 | Lorenz | Apr. 25, 1933 |
| 2,026,778 | Dumble | Jan. 7, 1936 |
| 2,220,511 | Carroll | Nov. 5, 1940 |
| 2,232,209 | Carroll | Feb. 18, 1941 |
| 2,238,970 | Carroll | Apr. 22, 1941 |
| 2,265,515 | Carroll | Dec. 9, 1941 |
| 2,308,039 | Ashlock | Jan. 12, 1943 |
| 2,308,154 | Carter | Jan. 12, 1943 |
| 2,387,709 | Ashlock | Oct. 30, 1945 |
| 2,398,780 | Ewald | Apr. 23, 1946 |
| 2,406,311 | Ashlock | Aug. 27, 1946 |
| 2,415 997 | Eldred | Feb. 18, 1947 |
| 2,672,229 | Ewald | Mar. 16, 1954 |
| 2,859,856 | Fox | Nov. 11, 1958 |